US012130584B2

(12) United States Patent
Kadowaki

(10) Patent No.: US 12,130,584 B2
(45) Date of Patent: Oct. 29, 2024

(54) IMAGE FORMING APPARATUS CONTROLLING BLOWING UNIT ACCORDING TO TEMPERATURE GRADIENT VALUE

(71) Applicant: CANON KABUSHIKI KAISHA, Tokyo (JP)

(72) Inventor: Hiroyuki Kadowaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 18/299,428

(22) Filed: Apr. 12, 2023

(65) Prior Publication Data

US 2023/0350343 A1 Nov. 2, 2023

(30) Foreign Application Priority Data

Apr. 28, 2022 (JP) ................................ 2022-075362

(51) Int. Cl.
*G03G 15/16* (2006.01)
*G03G 15/00* (2006.01)
(Continued)

(52) U.S. Cl.
CPC ......... *G03G 21/206* (2013.01); *G03G 15/161* (2013.01); *G03G 15/5045* (2013.01);
(Continued)

(58) Field of Classification Search
CPC ............. G03G 15/161; G03G 15/1675; G03G 15/5008; G03G 15/5045; G03G 15/5054;
(Continued)

(56) References Cited

U.S. PATENT DOCUMENTS 5,647,727 A * 7/1997 Taniguchi ............ G03G 21/206 399/92
2008/0089707 A1* 4/2008 Takayanagi ........ G03G 15/5045 399/44
(Continued)

FOREIGN PATENT DOCUMENTS

CN 107121993 A * 9/2017 ............ B41L 19/003
JP 2003-330350 A 11/2003
(Continued)

*Primary Examiner* — Robert B Beatty
(74) *Attorney, Agent, or Firm* — Canon U.S.A., Inc. IP Division

(57) ABSTRACT

An image forming apparatus includes a forming unit, a transfer unit, a blowing unit, a temperature detection unit, and a control unit. The forming unit forms a toner image on a photosensitive member. The transfer unit transfers the formed toner image onto a recording material. The blowing unit takes outside air into the apparatus to generate an air flow for adjusting a temperature of the transfer unit. The temperature detection unit detects an ambient temperature outside the apparatus. The control unit controls driving of the blowing unit based on the detected ambient temperature. The control unit drives the blowing unit in a case where the detected ambient temperature is less than or equal to a first temperature threshold and a gradient value indicating a change in the detected ambient temperature is at least a first gradient threshold.

20 Claims, 15 Drawing Sheets

(51) Int. Cl.
*G03G 21/00* (2006.01)
*G03G 21/20* (2006.01)

(52) U.S. Cl.
CPC ..... *G03G 15/5054* (2013.01); *G03G 15/1675* (2013.01); *G03G 15/5008* (2013.01); *G03G 2215/00084* (2013.01); *G03G 2221/1645* (2013.01)

(58) Field of Classification Search
CPC ................. G03G 21/20; G03G 21/206; G03G 2215/00084; G03G 2215/00139; G03G 2215/00772; G03G 2221/1645
USPC ......................................... 399/44, 92, 94, 97
See application file for complete search history.

(56) References Cited

U.S. PATENT DOCUMENTS

| | | | | |
|---|---|---|---|---|
| 2011/0026964 | A1* | 2/2011 | Yasumoto | G03G 21/206<br>399/94 |
| 2012/0027444 | A1* | 2/2012 | Kitagawa | G03G 15/2032<br>399/69 |
| 2019/0187593 | A1* | 6/2019 | Ishizuka | G03G 21/20 |
| 2020/0012215 | A1* | 1/2020 | Kobayashi | G03G 21/20 |

FOREIGN PATENT DOCUMENTS

| | | | | |
|---|---|---|---|---|
| JP | 2004-061553 | A | | 2/2004 |
| JP | 2005-115230 | A | | 4/2005 |
| JP | 2018-092096 | A | | 6/2018 |
| KR | 2007067540 | A | * | 6/2007 |
| KR | 2008032394 | A | * | 4/2008 |

* cited by examiner

IMAGE FORMING APPARATUS CONTROLLING BLOWING UNIT ACCORDING TO TEMPERATURE GRADIENT VALUE

BACKGROUND

Field

The present disclosure relates to an electrophotographic-type image forming apparatus.

Description of the Related Art

In an image forming apparatus such as a printer, when a transfer roller is in a low-temperature state, the electrical resistance value of a transfer unit including the transfer roller may rise, which can reduce the transferability of toner images. For example, when an apparatus installed in a room located in a cold region is operated first thing in the morning, the temperature in the apparatus tends to rise slowly compared to the rise in the room temperature (the temperature outside the apparatus) when a room heater is started, and a state of poor transferability of toner images can continue for a long time. On the other hand, even if the transfer roller has reached a high-temperature state, the electrical resistance value of a transfer unit including the transfer roller may drop, which can reduce the transferability of toner images. For example, when an apparatus installed in a room located in a warm region is operated for the first time in the morning, the temperature in the apparatus tends to drop slowly compared to the drop in the room temperature when an air conditioner is started, and a state of poor transferability of toner images can continue for a long time. Additionally, in an image forming apparatus that includes an intermediate transfer member, the transferability of toner images may drop in a similar manner when the intermediate transfer member is in a low-temperature state or a high-temperature state.

Japanese Patent Laid-Open No. 2005-115230 discloses a configuration in which, when the resistance value of a transfer roller is high, the transfer roller is heated by opening a shutter disposed between a fixing unit and a transfer unit and using a fan to deliver air heated by heat from the fixing unit to the transfer unit. Additionally, Japanese Patent Laid-Open No. 2005-115230 discloses a configuration in which, when the resistance value of the transfer roller is low, the stated shutter is closed to suppress the inflow of hot air from the fixing unit to the transfer unit, and the outside air is taken into the apparatus by using a fan to discharge the hot air in the apparatus to the outside of the apparatus. Such a configuration aims to ensure stable transferability by quickly raising or lowering the ambient temperature of the transfer roller.

However, with this past technique, for example, when the apparatus is operated for the first time in the morning in a room, located in a cold region, which has not yet been heated by a room heater, the fixing unit is not yet warm, which makes it difficult to raise the temperature of the transfer roller using heat from the fixing unit. Furthermore, if standby temperature adjustment is not being performed for the fixing unit to save energy, it may not be possible to efficiently raise the temperature of the transfer roller using heat from the fixing unit. In such a case, even if air is delivered to the transfer unit using a fan, the ambient temperature of the transfer roller cannot be raised, which can result in power being needlessly consumed to drive the fan, and the accompanying fan noise being produced needlessly as well.

On the other hand, if, for example, the apparatus is operated in a room, located in a warm region, which has not yet been air-conditioned, even if a fan is used to bring outside air into the apparatus, the temperature in the apparatus cannot be lowered by the uncooled outside air. In such a case, even if outside air is taken in using a fan, the ambient temperature of the transfer roller cannot be lowered, which can result in power being needlessly consumed to drive the fan, and the accompanying fan noise being produced needlessly as well.

SUMMARY

The present disclosure provides a technique for ensuring stable transferability while avoiding wasteful power consumption, by driving a fan for temperature adjustment in an image forming apparatus more efficiently.

According to an aspect of the present disclosure, an image forming apparatus includes a forming unit configured to form a toner image on a photosensitive member, a transfer unit configured to transfer the toner image formed on the photosensitive member onto a recording material, a blowing unit configured to take outside air into the image forming apparatus to generate an air flow for adjusting a temperature of the transfer unit, a temperature detection unit configured to detect an ambient temperature outside the image forming apparatus, and a control unit configured to control driving of the blowing unit based on the ambient temperature detected by the temperature detection unit, wherein the control unit drives the blowing unit in a case where the ambient temperature detected by the temperature detection unit is less than or equal to a first temperature threshold and a gradient value indicating a change in the detected ambient temperature is at least a first gradient threshold.

Further features of the present disclosure will become apparent from the following description of exemplary embodiments (with reference to the attached drawings).

DESCRIPTION OF THE EMBODIMENTS

Figure 1A:
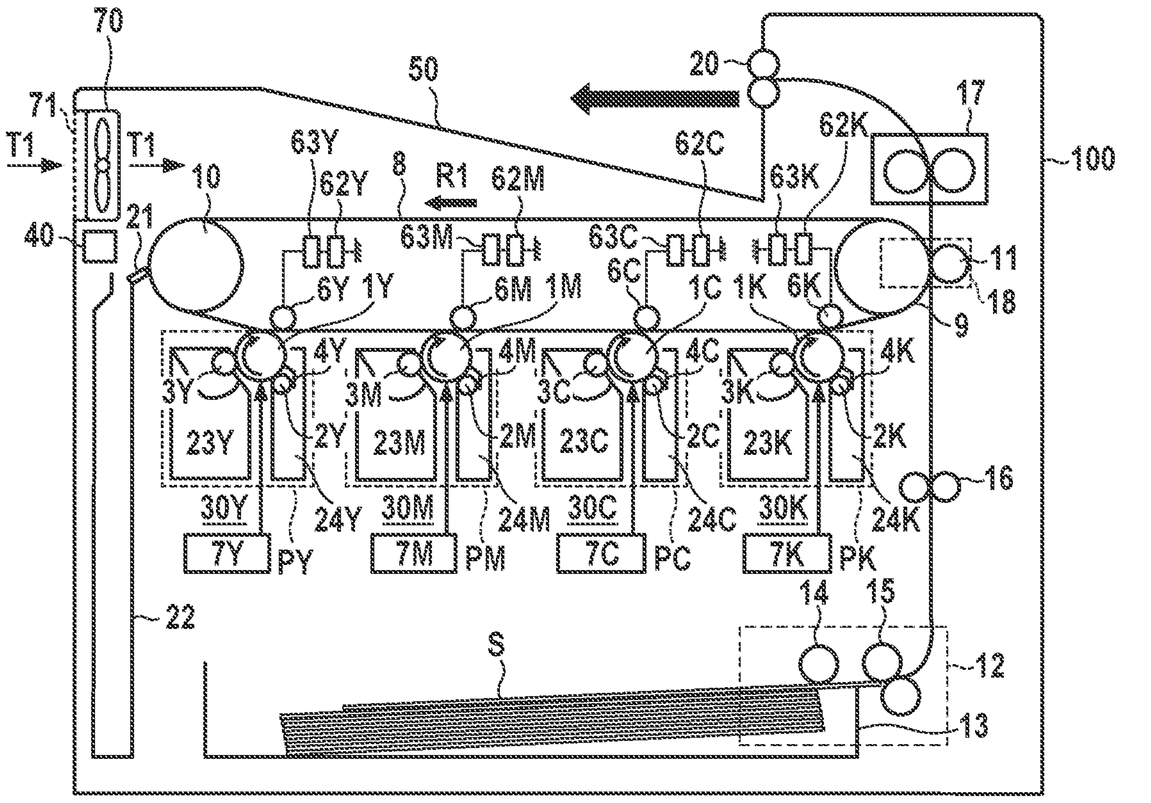
FIG. 1A is a cross-sectional view illustrating an example of the hardware configuration of an image forming apparatus.

Hereinafter, embodiments will be described in detail with reference to the attached drawings. Note, the following embodiments are not intended to limit the scope of the claimed subject matter terms. Multiple features are described in the embodiments, but limitation is not made that requires all such features, and multiple such features may be combined as appropriate. Furthermore, in the attached drawings, the same reference numerals are given to the same or similar configurations, and redundant description thereof is omitted.

First Embodiment

An electrophotographic laser printer will be described as an example of an image forming apparatus. However, the image forming apparatus is not intended to be limited only to a laser printer, and may be another type of image forming apparatus, such as a printer, a copier, a facsimile device, or the like.

<Image Forming Apparatus>

FIG. 1A is a cross-sectional view illustrating an example of the hardware configuration of an image forming apparatus 100 according to a first embodiment of the present disclosure. The image forming apparatus 100 is configured to form images using an electrophotographic method. The image forming apparatus 100 is configured as an in-line laser printer that employs an intermediate transfer method, and is capable of forming a full-color image. The image forming apparatus 100 uses an intermediate transfer belt as an intermediate transfer member.

The image forming apparatus 100 includes image forming units 30Y, 30M, 30C, and 30K as a plurality of image forming units that form images of mutually-different colors. The image forming units 30Y, 30M, 30C, and 30K are arranged in a row from an upstream side to a downstream side in a movement direction R1 of a surface of an intermediate transfer belt 8, which carries a toner image. The image forming units 30Y, 30M, 30C, and 30K form images using yellow, magenta, cyan, and black toner, respectively. The image forming units 30Y, 30M, 30C, and 30K have the same configuration. Note that the letters Y, M, C, and K appended to the reference signs indicate yellow, magenta, cyan, and black toner colors, respectively, and will be omitted in descriptions of items that are the same for all colors.

The image forming unit 30 includes a process cartridge P that can be attached to and removed from the image forming apparatus 100. The process cartridge P includes a photosensitive drum 1, a charging roller 2, a developing roller 3, a toner receptacle 23, a cleaning blade 4, and a waste toner receptacle 24. The toner receptacle 23 holds a developing agent (toner) to be supplied to the developing roller 3. The image forming unit 30 further includes a laser unit 7 disposed below the process cartridge P.

The photosensitive drum 1 is an image carrier that carries an electrostatic latent image and a toner image formed by developing the electrostatic latent image using the toner. The photosensitive drum 1 is driven to rotate at a predetermined rotational speed in the direction of the arrow indicated in FIG. 1A (the clockwise direction). The rotational speed of the photosensitive drum 1 is set to be equal to a process speed (described later), and for example, is set to 300 mm/s when forming an image on plain paper.

The charging roller 2 uniformly charges the surface of a photosensitive drum 1. The laser unit 7 forms an electrostatic latent image on the surface of the photosensitive drum 1 by exposing the photosensitive drum 1 based on an image signal (image data). The developing roller 3 forms the toner image on the photosensitive drum 1 by developing the electrostatic latent image formed on the photosensitive drum 1 using the toner supplied from the toner receptacle 23. Specifically, a predetermined voltage is applied to the developing roller 3 from a voltage application unit (not shown), which causes the toner on the developing roller 3 to move onto and adhere to the photosensitive drum 1, and the electrostatic latent image on the photosensitive drum 1 is developed into a toner image as a result. In the present embodiment, the photosensitive drum 1 is an example of a photosensitive member, and the charging roller 2, the developing roller 3, and the laser unit 7 are an example of a forming unit that forms a toner image on the photosensitive member. Furthermore, the charging roller 2 is an example of a charging unit, and the laser unit 7 is an example of an exposure unit.

The image forming apparatus 100 includes the intermediate transfer belt 8, which is disposed in a position opposite each photosensitive drum 1. The intermediate transfer belt 8 is a flexible, endless belt-shaped intermediate transfer member (transfer-receiving member). In the present embodiment, the intermediate transfer belt 8 is constituted by an ion-conducting material. The intermediate transfer belt 8 is stretched over a drive roller 9 for rotating the intermediate transfer belt 8 and a driven roller 10 for applying a suitable tension to the intermediate transfer belt 8. By transmitting a driving force to the drive roller 9 using a drive motor (not shown), the intermediate transfer belt 8 is rotationally driven in the direction of the arrow R1 (the counterclockwise direction) while contacting the photosensitive drum 1. The intermediate transfer belt 8 moves at a speed corresponding to the rotational speed of the photosensitive drum 1 (e.g., 300 mm/s).

A primary transfer roller 6 is disposed on the inner side of the intermediate transfer belt 8 as a transfer member that transfers the toner image from the photosensitive drum 1 to the intermediate transfer belt 8. A metal roller is used as the primary transfer roller 6 in the present embodiment. Meanwhile, the primary transfer roller 6 is disposed in a position offset from a transfer position (a primary transfer unit), which is a position where the photosensitive drum 1 and the intermediate transfer belt 8 come into contact and the toner image is transferred from the photosensitive drum 1 to the intermediate transfer belt 8. In other words, a contact end between the primary transfer roller 6 and the intermediate transfer belt 8 is positioned a predetermined distance (e.g., 3 mm) from a contact end between the photosensitive drum 1 and the intermediate transfer belt 8.

The image forming apparatus 100 further includes a voltage application unit 62 that applies a transfer voltage (a primary transfer voltage) to the primary transfer roller 6, and a current detection unit 63 that detects primary transfer current flowing at the primary transfer unit. A toner image formed on the photosensitive drum 1 is transferred onto the intermediate transfer belt 8 at the transfer position (the primary transfer unit) as a result of the primary transfer voltage being applied to the primary transfer roller 6 by the voltage application unit 62. At this time, toner images of four colors, namely Y, M, C, and K, formed on the photosensitive drums 1Y, 1M, 1C, and 1K, respectively, are sequentially superimposed and transferred onto the intermediate transfer belt 8. The toner image formed on the intermediate transfer belt 8 is transported to a secondary transfer unit 18, which is a point of contact between the intermediate transfer belt 8 and a secondary transfer roller 11, in accordance with the rotation of the intermediate transfer belt 8. At the secondary transfer unit 18, the toner image on the intermediate transfer belt 8 is transferred onto a recording material S transported along a transport path from a recording material cassette 13.

Sheet-shaped recording material S is stacked and stored in the recording material cassette 13. A feed/transport device 12 includes a paper feed roller 14 and a transport roller pair 15. The paper feed roller 14 is configured to feed the recording material S from the recording material cassette 13 to the transport path. The transport roller pair 15 is configured to transport the recording material S fed into the transport path toward a registration roller pair 16 at a speed corresponding to the rotational speed of the intermediate transfer belt 8 (e.g., 300 mm/s). The recording material S transported to the registration roller pair 16 is transported to the secondary transfer unit 18 at a predetermined control timing by the registration roller pair 16. The toner image on the intermediate transfer belt 8 is transferred onto the recording material S at the secondary transfer unit 18 as a result of a secondary transfer voltage being applied to the secondary transfer roller 11 by a voltage application unit (not shown).

The recording material S onto which the toner image has been transferred at the secondary transfer unit 18 is transported to a fixing device 17. The fixing device 17 performs fixing processing for fixing the transferred toner image onto the recording material S by applying heat and pressure to the recording material S. The recording material S subjected to the fixing processing is discharged onto a discharge tray 50 by a discharge roller pair 20.

Toner remaining on the surface of the photosensitive drum 1 after the transfer of the toner image from the photosensitive drum 1 to the intermediate transfer belt 8 is removed by the cleaning blade 4. The cleaning blade 4 makes contact with the photosensitive drum 1 to collect the toner on the photosensitive drum 1 into the waste toner receptacle 24. Additionally, the toner remaining on the surface of the intermediate transfer belt 8 after the toner image has been transferred from the intermediate transfer belt 8 to the recording material S, and paper debris that has moved from the recording material S to the intermediate transfer belt 8 during the transfer, are removed by a cleaning blade 21. The cleaning blade 21 makes contact with the intermediate transfer belt 8 to collect the toner and paper debris on the intermediate transfer belt 8 into a waste toner receptacle 22.

<Control Configuration of Image Forming Apparatus>

Figure 1B:
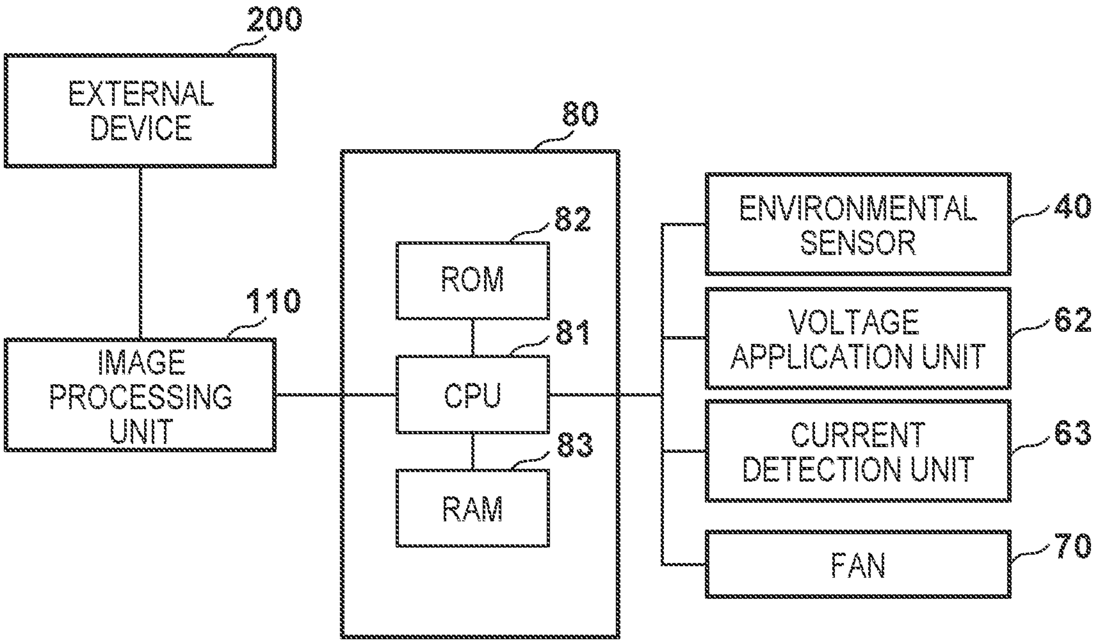
FIG. 1B is a block diagram illustrating an example of the overall control configuration of the image forming apparatus.

FIG. 1B is a block diagram illustrating an example of the overall control configuration of the image forming apparatus 100. The image forming apparatus 100 includes a control unit 80 that controls the operations of the apparatus as a whole. The control unit 80 includes a CPU 81, a ROM 82, and a RAM 83. The ROM 82 is a non-volatile storage device storing programs such as control programs for controlling the operations of the image forming apparatus 100. The RAM 83 is a volatile storage device used as a temporary storage area for programs and data and a work area for the CPU 81.

The CPU 81 controls the operations of each device in the image forming apparatus 100 by reading out programs stored in the ROM 82 into the RAM 83 and executing those programs. The CPU 81 controls the operations of each device in the image forming apparatus 100 such that an image is formed on the recording material S based on image information (image data) received from an external device 200 such as a personal computer (PC) or the like. At this time, the CPU 81 controls the operations of each respective device based on data obtained as a result of an image processing unit 110 performing predetermined image processing on the image information (image data) received from the external device 200.

The image processing unit 110 performs character code bitmap conversion processing or image halftoning processing, for example, as the image processing on the image information (image data) received from the external device 200. The image processing unit 110 also analyzes the image information (image data) and determines a type of image pattern (e.g., a text image, a solid image, a halftone image, or the like).

<Control of Primary Transfer Voltage>

In the image forming apparatus 100 of the present embodiment, the primary transfer voltage is determined by Auto Transfer Voltage Control (ATVC) in order to stably apply a primary transfer voltage in which the effects of electrical resistance unevenness in the intermediate transfer belt 8, environmental variations in the electrical characteristics of the intermediate transfer belt 8, and the like are reduced. Note that ATVC is executed for each of the image forming units 30Y, 30M, 30C, and 30K.

In ATVC, constant current control which adjusts an output voltage value of the voltage application unit 62 is performed such that a current value detected by the current detection unit 63 takes on a target current value while a non-image region of the photosensitive drum 1, where no toner image is formed, is passing the primary transfer unit. The target current value of the primary transfer current is a current value required to achieve good transferability. ATVC is performed, for example, when not forming an image, such as during advance rotation operations to prepare for image forming operations. Note that fluctuations in the electrical resistance value at the primary transfer unit (mainly the electrical resistance value of the intermediate transfer belt 8, in the present embodiment) can be detected based on the output voltage value of the voltage application unit 62 obtained through this constant current control.

During image formation, the control unit 80 determines a voltage value to be used in the control of the voltage application unit 62 (a primary transfer voltage value) by performing computation processing on the output voltage value obtained through the stated constant current control. In this computation processing, the primary transfer voltage value is determined, for example, by calculating the average value of the output voltage value, or by multiplying the average value of the output voltage value by a predetermined coefficient. The control unit 80 performs constant voltage control that controls the output voltage of the voltage application unit 62 such that the output voltage value of the voltage application unit 62 is constant at the determined voltage value. Such control makes it possible to apply an appropriate primary transfer voltage to the primary transfer roller 6 when forming an image, which in turn makes it possible to output (form) high-quality images in a stable manner.

<Temperature Adjustment Mechanism of Image Forming Apparatus>

Figure 2:
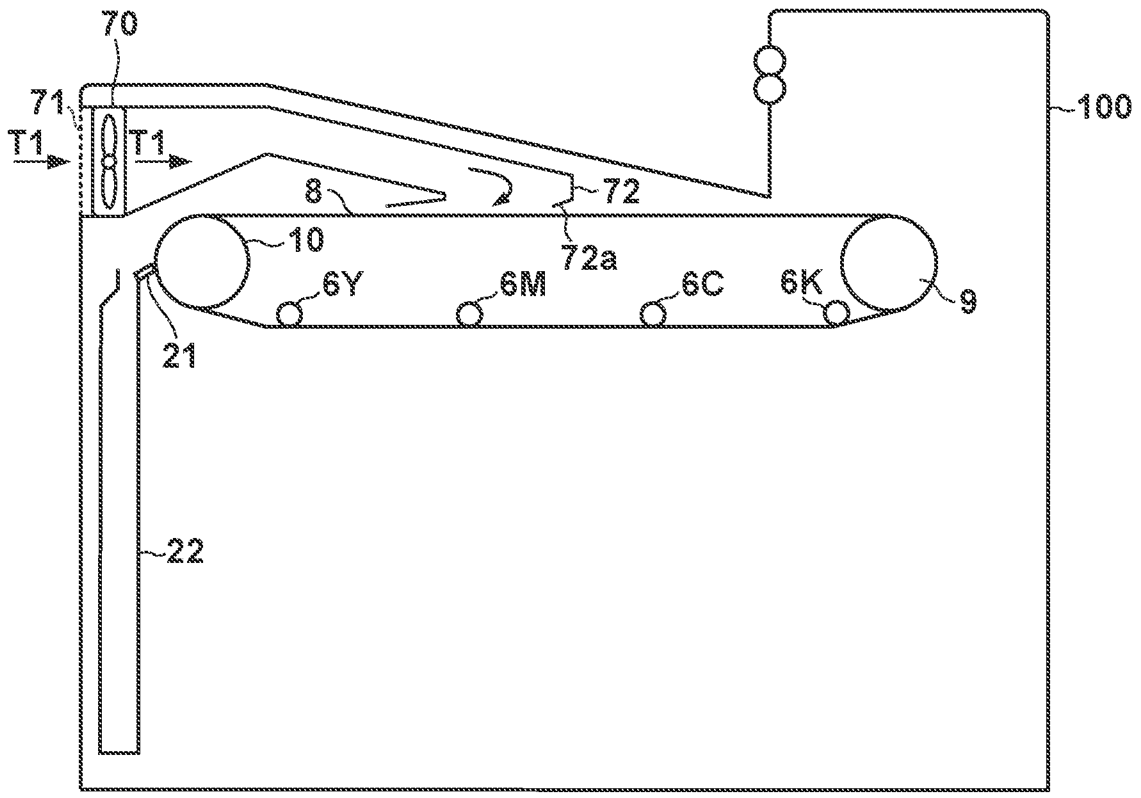
FIG. 2 illustrates an example of a path through which air flow produced by a fan passes within the image forming apparatus.

The image forming apparatus 100 of the present embodiment includes a fan 70 that takes outside air into the image forming apparatus 100 as a temperature adjustment mechanism for adjusting the temperature within the apparatus. The fan 70 is an intake-type fan that takes outside air into the interior of the image forming apparatus 100 to generate an air flow T1. In the image forming apparatus 100, the fan 70 is disposed in the vicinity of an opening 71 formed in a side surface of the image forming apparatus 100, as illustrated in FIGS. 1A and 2. The opening 71 enables the inside and the outside of the image forming apparatus 100 to communicate. The fan 70 is disposed within the image forming apparatus 100 opposite the opening 71. Note that in the present embodiment, the fan 70 is an example of a blower unit that takes outside air into the image forming apparatus 100 to generate an air flow T for adjusting the temperature of the intermediate transfer belt 8. The intermediate transfer belt 8 is an example of a transfer unit for transferring a toner image formed on the photosensitive drum 1 onto a recording material.

In the present embodiment, the fan 70 is mainly used to cool the intermediate transfer belt 8, but may also be used to raise the temperature of the intermediate transfer belt 8 when the belt is in a low-temperature state. In other words, the fan 70 is used to adjust the temperature of the intermediate transfer belt 8. The cleaning blade 21 gradually heats up during image formation due to the effects of heat produced by the fixing device 17 or other electrical components (not shown) within the image forming apparatus 100, frictional heat produced between the intermediate transfer belt 8 and the cleaning blade 21, and the like. As the temperature near the cleaning blade 21 rises, the toner remaining on the surface of the intermediate transfer belt 8 melts due to the heat and adheres to the cleaning blade 21. As a result, the toner remaining on the surface of the intermediate transfer belt 8 cannot be completely removed by the cleaning blade 21. Such cleaning issues can lead to image defects.

The image forming apparatus 100 of the present embodiment is configured to cool the intermediate transfer belt 8 and the cleaning blade 21 by sending outside air to the intermediate transfer belt 8 using the fan 70 in order to suppress image defects such as those described above. Specifically, as illustrated in FIG. 2, a duct 72 is provided above the intermediate transfer belt 8, and the fan 70 is disposed at an inlet part of the duct 72. The duct 72 is configured to direct the air flow T1, produced by the fan 70 taking in air from the exterior of the image forming apparatus 100, to the intermediate transfer belt 8. The outside air flowing through the duct 72 is sent from an opening 72*a*, provided at an outlet part of the duct 72, to the intermediate transfer belt 8. In this manner, the temperature of the intermediate transfer belt 8 can be brought closer the temperature of the outside air by producing the air flow T1 directed toward the intermediate transfer belt 8.

Additionally, the image forming apparatus 100 of the present embodiment includes an environmental sensor 40 disposed in the image forming apparatus 100 near the opening 71, as illustrated in FIG. 1A. The environmental sensor 40 is constituted by a temperature/humidity sensor that detects an ambient temperature outside the image forming apparatus 100, and is an example of a temperature detection unit. The environmental sensor 40 is connected to the control unit 80. The control unit 80 controls the driving of the fan 70 based on the temperature detected by the environmental sensor 40.

<Effects of Changes in Temperature on Image Forming Apparatus>

A drop in the transferability of toner images as an effect of the temperature within the image forming apparatus 100 changing will be described next. In the image forming apparatus 100 described thus far, the transferability of a toner image may drop due to fluctuations in the electrical resistance value at the primary transfer unit, where the toner image is transferred to the intermediate transfer belt 8. Note that the electrical resistance of the primary transfer unit includes the electrical resistance of the intermediate transfer belt 8 and the electrical resistance of the primary transfer roller 6.

Here, a case where the image forming apparatus 100 described above, which is located in an office room in a cold region, suspends operations for the night and then resumes use the next morning will be assumed as an example. In an office environment in a cold region, for example, the room temperature rises when a heating device is used to heat the room first thing in the morning, but the temperature in the image forming apparatus 100 rises slowly compared to the room temperature.

Figure 3:
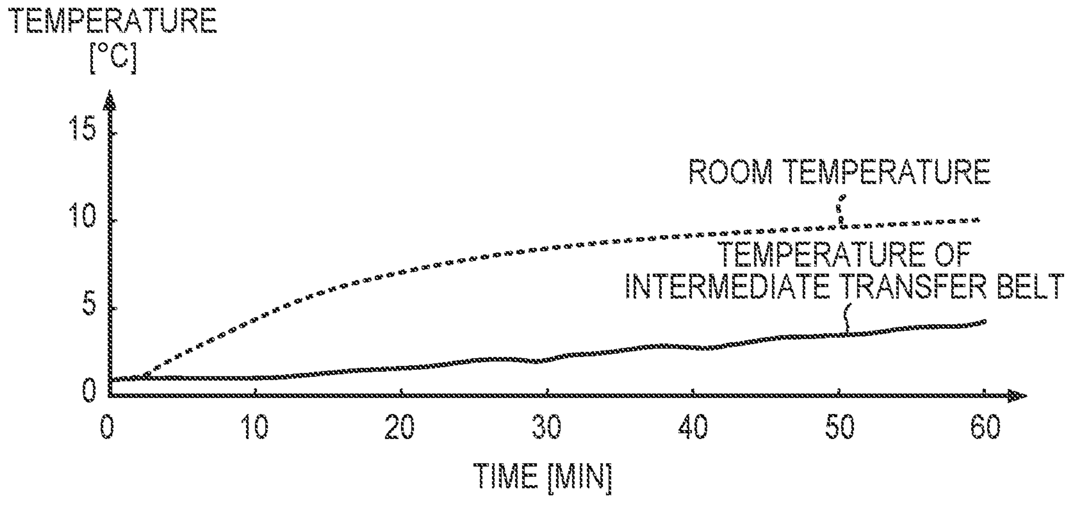
FIG. 3 is a diagram illustrating an example of transitions in room temperature and transitions in the temperature of an intermediate transfer belt.

FIG. 3 is a diagram illustrating an example of transitions in room temperature and transitions in the temperature of the intermediate transfer belt 8 within the image forming apparatus 100 when an office environment in a cold region is heated first thing in the morning. In the example illustrated in FIG. 3, the room temperature is result of detection performed by the environmental sensor 40 within the image forming apparatus 100, and the temperature of the intermediate transfer belt 8 is a result of measurement when a type-E thermocouple takes a measurement by being brought into contact opposite the driven roller 10 over the intermediate transfer belt 8. As described above, the environmental sensor 40 is provided in order to detect the ambient temperature outside the image forming apparatus 100.

As illustrated in FIG. 3, the temperature of the intermediate transfer belt 8 in the image forming apparatus 100 increases gradually compared to the increase in the ambient temperature outside the image forming apparatus 100 (the room temperature), and the low-temperature state continues for an extended period of time. In such a low-temperature state, the electrical resistance value of the intermediate transfer belt 8 increases, and the electrical resistance value of the primary transfer roller 6 similarly increases. In this manner, when the electrical resistance value at the primary transfer unit (in the present embodiment, mainly the electrical resistance value of the intermediate transfer belt 8) increases, the transferability of the toner image at the primary transfer unit decreases, for the reasons described hereinafter.

Figure 4:
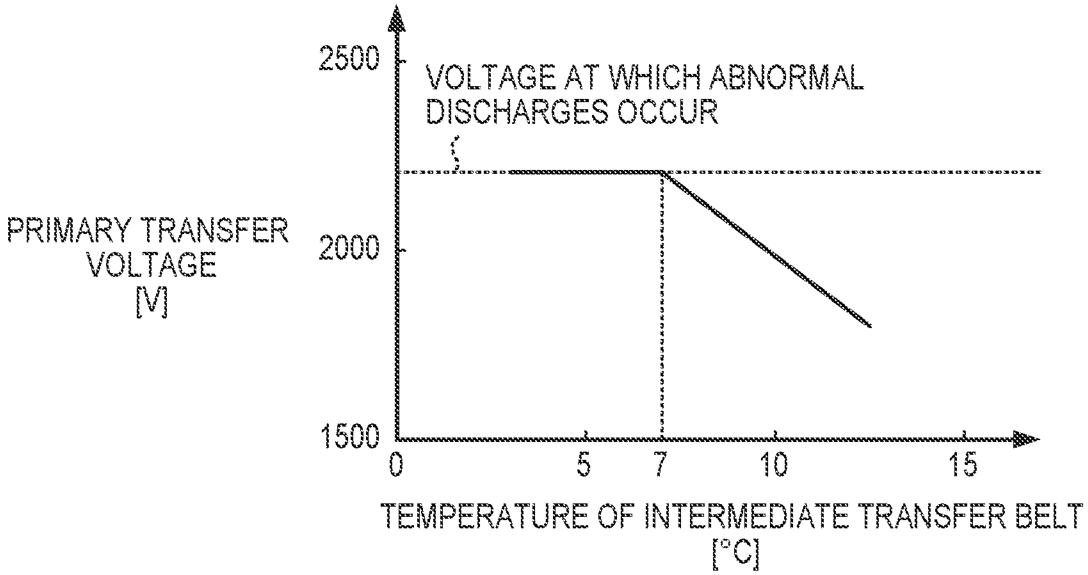
FIG. 4 illustrates an example of a relationship between the temperature of the intermediate transfer belt and a primary transfer voltage.
Figure 5:
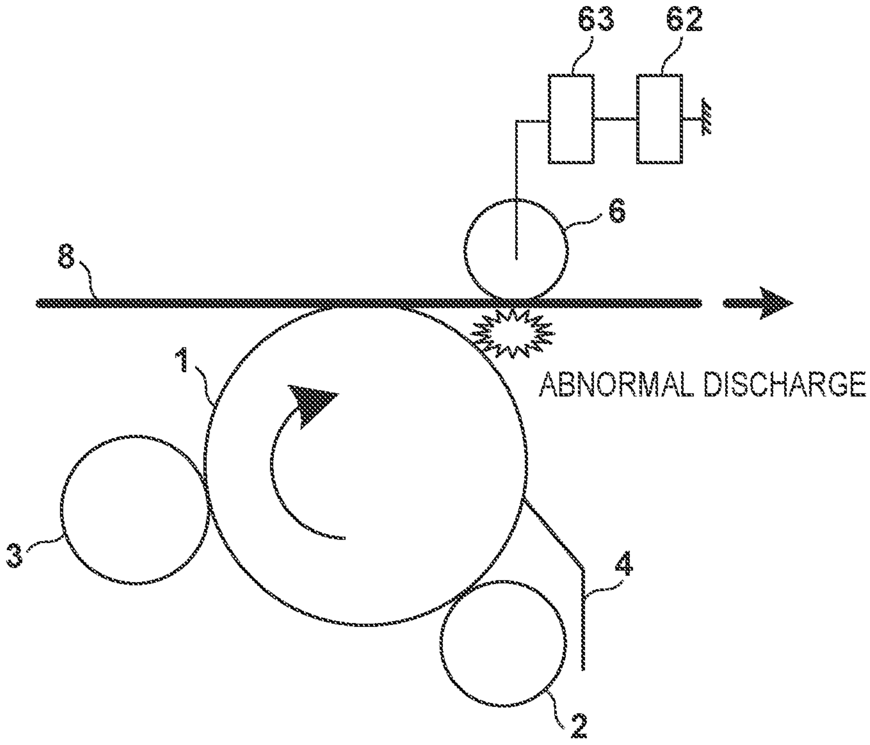
FIG. 5 is an enlarged view of the vicinity of a primary transfer unit in the image forming apparatus.

FIG. 4 illustrates an example of a relationship between the temperature of the intermediate transfer belt 8 and the primary transfer voltage determined through ATVC. FIG. 5 is an enlarged view of the vicinity of the primary transfer unit in the image forming apparatus 100. Although FIG. 4 illustrates an example of the relationship obtained for the image forming unit 30Y, similar relationships can be obtained for the image forming units 30M, 30C, and 30K. In this example, the target current value of the primary transfer current when performing ATVC is set to 16 μA. Note that the target current value of the primary transfer current is not limited to this value, and is set as appropriate based on the configuration of the image forming unit 30, the temperature and humidity in the installation environment of the image forming apparatus 100, and the like.

As illustrated in FIG. 4, in the image forming apparatus 100 of the present embodiment, when the temperature of the intermediate transfer belt 8 drops, the primary transfer voltage required to apply a primary transfer current having the target current value to the primary transfer unit increases. This is because the electrical resistance value of the intermediate transfer belt 8 increases as the temperature of the intermediate transfer belt 8 drops. When a large potential difference arises between the primary transfer roller 6 and the photosensitive drum 1 due to an increase in the primary transfer voltage, an abnormal discharge occurs between the primary transfer roller 6 and the photosensitive drum 1, as illustrated in FIG. 5. In the example in FIG. 4, when the temperature of the intermediate transfer belt 8 drops below 7° C. (corresponding to a "second temperature threshold", described later), an abnormal discharge will occur at the primary transfer unit when ATVC is executed.

Here, the electrical resistance of the intermediate transfer belt 8, which includes an ion-conducting material, is susceptible to fluctuations depending on the installation environment of the image forming apparatus 100. In a low-temperature environment (e.g., less than 13° C.), the durability of the intermediate transfer belt 8 changes, which makes it easier for the rise in electrical resistance caused by image forming processing to occur. In particular, as illustrated in FIGS. 1A, 1B, and 5, in a configuration in which the primary transfer roller 6 is disposed further downstream in the movement direction of the intermediate transfer belt 8 than the transfer position where the photosensitive drum 1 and the intermediate transfer belt 8 make contact (the primary transfer unit), the electrical resistance value of the primary transfer unit is almost equal to the electrical resistance value of the intermediate transfer belt 8. In this case, a large potential difference between the primary transfer roller 6 and the photosensitive drum 1 is required in order to maintain the transferability of the toner image at the primary transfer unit, which makes the abnormal discharge more likely to occur.

A region on the photosensitive drum 1 that is subjected to this abnormal discharge remains at an uneven potential even after the charging processing by the charging roller 2. Such potential unevenness is developed by the developing roller 3 as a discharge mark, and as a result, density unevenness can arise in the toner image formed on the photosensitive drum 1. Accordingly, ATVC prevents a voltage value of at least the voltage value that produces an abnormal discharge from being set as the primary transfer voltage, in order to prevent such abnormal discharges from occurring.

Specifically, during constant current control executed in ATVC, the control unit 80 increases the output voltage value of the voltage application unit 62 such that the current value of the primary transfer current detected by the current detection unit 63 converges on the target current value. When this output voltage value exceeds the voltage value at which abnormal discharges occur, overcurrent flows through the current detection unit 63. When overcurrent is detected, the control unit 80 sets the output voltage value of the voltage application unit 62 to a voltage value lower than the voltage value at which abnormal discharges occur, and again increases the output voltage value of the voltage application unit 62 such that the current value of the primary transfer current converges on the target current value. Then, when the abnormal discharge occurs again, the control unit 80 sets the output voltage value of the voltage application unit 62 to a low voltage value. Repeating such operations for adjusting the output voltage value causes the output voltage value of the voltage application unit 62 to fluctuate near the voltage value at which abnormal discharges occur. Ultimately, a voltage value less than the voltage value at which abnormal discharges occur is set as the primary transfer voltage value, which prevents abnormal discharges from occurring when images are formed.

Accordingly, when the temperature of the intermediate transfer belt 8 is within a range lower than a temperature threshold, which corresponds to 7° C. in the example illustrated in FIG. 4, the primary transfer current necessary for maintaining the transferability of toner images at the primary transfer unit cannot flow to the primary transfer unit. This leads to a drop in the transferability of toner images.

In the present embodiment, when the temperature of the outside air is rising, such as when heating an office environment located in a cold region first thing in the morning, and the temperature in the image forming apparatus 100 is assumed to be lower than the temperature of the outside air, the outside air is taken into the image forming apparatus 100 by driving the fan 70. The intake of outside air causes the temperature within the image forming apparatus 100 to rise, which in turn causes the temperature of the intermediate transfer belt 8 to rise. This shortens a period in which the transferability of toner images drops due to the intermediate transfer belt 8 being in a low-temperature state.

<Fan Drive Control>

Figure 6:
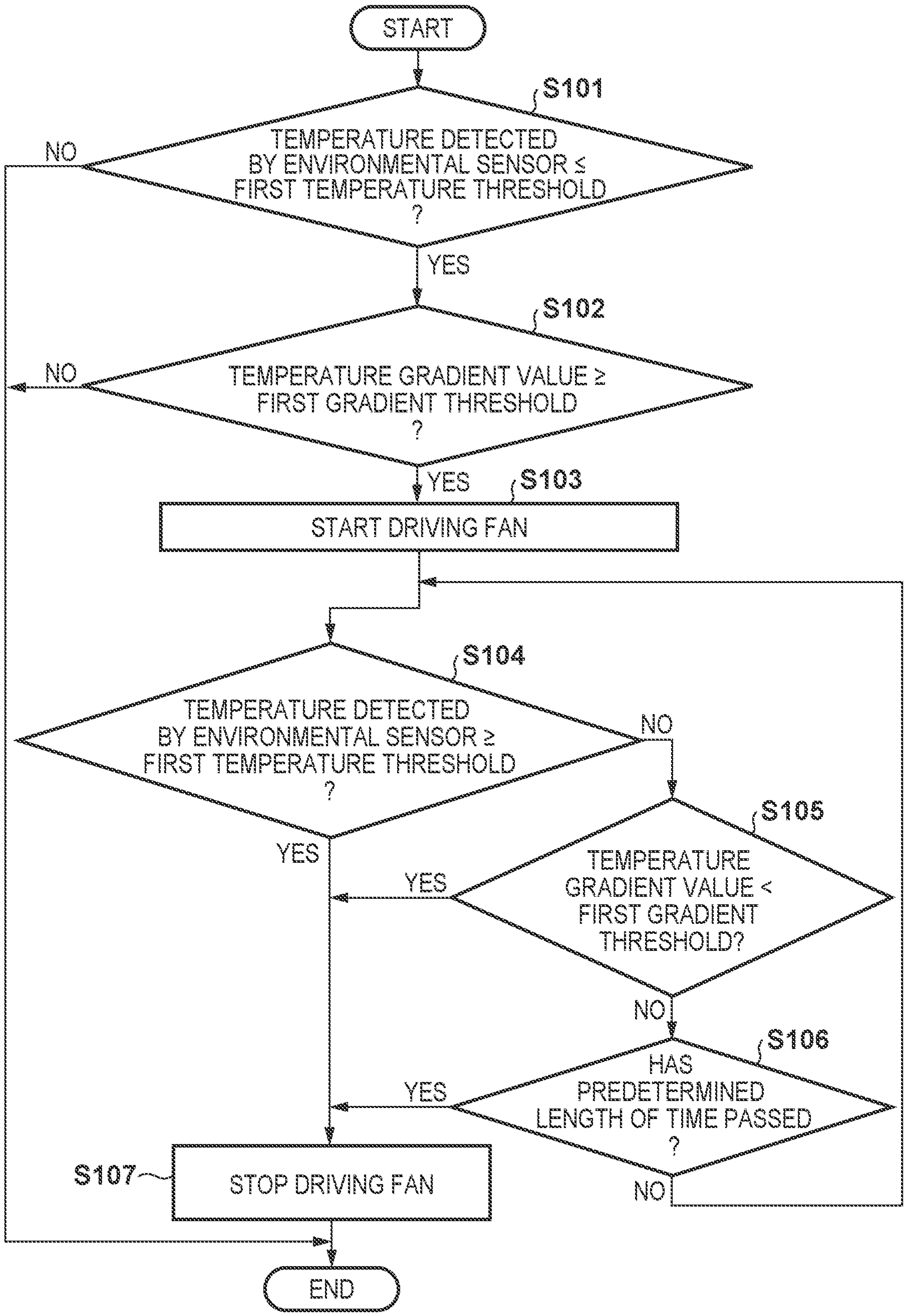
FIG. 6 is a flowchart illustrating a sequence of fan drive control (a first embodiment).

FIG. 6 is a flowchart illustrating a sequence of drive control of the fan 70 in the image forming apparatus 100 of the present embodiment.

In step S101, the control unit 80 determines whether the temperature detected by the environmental sensor 40 is less than or equal to a first temperature threshold. In the present embodiment, the first temperature threshold is set to 13° C., for example. Whether the image forming apparatus 100 is currently in a low-temperature environment is determined as a result of this determination. If the temperature detected by the environmental sensor 40 is less than or equal to the first temperature threshold, the control unit 80 moves the sequence to step S102, whereas if the temperature is not less than or equal to the first temperature threshold, the control unit 80 ends the processing without driving the fan 70.

In step S102, the control unit 80 determines whether a temperature gradient value (temperature gradient) of the temperature detected by the environmental sensor 40 is at least a predetermined first gradient threshold. The temperature gradient value is obtained as the temperature increase per unit of time, and is a value indicating a change in the temperature detected by the environmental sensor 40. For example, the value of a difference between the current temperature detected by the environmental sensor 40 and the temperature detected the unit of time earlier (a predetermined time earlier) is obtained as the temperature gradient value. In one example, the aforementioned unit of time is set to ten minutes, and the first gradient threshold is set to 1° C. (i.e., a temperature increase of 1° C. every ten minutes). The unit of time may be set to a time other than ten minutes (e.g., one minute). The control unit 80 moves the sequence to step S103 if the temperature gradient value is at least the first gradient threshold, and ends the processing if the temperature gradient value is not at least the first gradient threshold.

Whether the temperature outside the image forming apparatus 100 is rising is determined through the determination of step S102. If the temperature outside the image forming apparatus 100 (the temperature of the outside air) is not rising, the inside of the image forming apparatus 100 cannot be warmed by air taken in even if the fan 70 is driven and the outside air is taken into the image forming apparatus 100. On the other hand, if the temperature outside the image forming apparatus 100 (the temperature of the outside air) is rising, the inside of the image forming apparatus 100 can be warmed by air taken in, by driving the fan 70 and taking the outside air into the image forming apparatus 100. In this manner, it is possible to drive the fan 70 only when the interior of the image forming apparatus 100 can be warmed by the outside air, which makes it possible to avoid consuming power needlessly by driving the fan 70.

Accordingly, in the present embodiment, when the temperature gradient value of the temperature detected by the environmental sensor 40 is at least the first gradient threshold, the control unit 80 moves the sequence from step S102 to step S103, and starts driving the fan 70, to warm the interior of the image forming apparatus 100. This brings outside air into the image forming apparatus 100, causing the temperature inside the apparatus to rise.

When the driving of the fan 70 is started, the control unit 80 moves the sequence to step S104, and determination processing of steps S104 to S106 is performed. In this determination processing, whether a condition for stopping the driving of the fan 70 has been met is determined. The control unit 80 moves the sequence to step S107 when any of the conditions specified in steps S104 to S106 are met, and stops driving the fan 70.

To be more specific, in step S104, the control unit 80 determines whether the temperature detected by the environmental sensor 40 is at least the first temperature threshold, moves the sequence to step S107 if the detected temperature is at least the first temperature threshold, and moves the sequence to step S105 if not. In step S105, the control unit 80 determines whether the temperature gradient value of the temperature detected by the environmental sensor 40 is less than the first gradient threshold, moves the sequence to step S107 if the temperature gradient value is less than the first gradient threshold, and moves the sequence to step S106 if not. In step S106, the control unit 80 determines whether a predetermined length of time has passed after the start of driving the fan 70, moves the sequence to step S107 if the predetermined length of time has passed, and returns the sequence to step S104 and repeats the aforementioned determinations if not.

When the sequence moves to step S107 from any of steps S104 to S106, the control unit 80 stops driving the fan 70 and ends the processing of the sequence in FIG. 6. The first temperature threshold used in step S104 is set to the same value as that used in step S101, but may be set to a different value. Similarly, the first gradient threshold used in step S105 is set to the same value as that used in step S102, but may be set to a different value. These thresholds are set as appropriate based on the configuration of the image forming apparatus 100 and the like. Additionally, only some (one or two) of the three conditions for stopping the driving of the fan 70, determined in steps S104 to S106, may be used.

<Control of Process Speed>

In the image forming apparatus 100 installed in an office environment or the like in a cold region, a period occurs in which the transferability of toner images at the primary transfer unit drops until the temperature of the intermediate transfer belt 8 rises enough after the start of driving the fan 70 through the sequence illustrated in FIG. 6. This is because the maximum value of the primary transfer voltage that can be set through ATVC is limited in order to prevent abnormal discharges from occurring when forming an image, as described above.

The image forming apparatus 100 of the present embodiment may perform control, to temporarily reduce the process speed in order to avoid such a drop in the transferability of toner images, until the intermediate transfer belt 8 exits the low-temperature state. The process speed corresponds to a transport speed of the recording material S.

Specifically, the control unit 80 obtains the temperature of the intermediate transfer belt 8 (e.g., an estimated value based on the temperature detected by the environmental sensor 40), and changes the process speed at the time of image formation from a normal speed to a low speed when the temperature is below the second temperature threshold (e.g., 7° C.). For example, the normal speed is set to 300 mm/s, and the low speed is set to 100 mm/s. This makes it possible to achieve better transferability (avoid a drop in transferability) while preventing abnormal discharges from occurring.

Note that the control unit 80 may predict a period during which the temperature of the intermediate transfer belt 8 continues to fall below the second temperature threshold (e.g., ten minutes) based on the temperature detected by the environmental sensor 40, and change the process speed during that period from the normal speed to the low speed. In this case, the control unit 80 may change the process speed from the low speed to the normal speed after that end of the period. By reducing the process speed in this manner, the primary transfer voltage that is used can be lowered, and good transferability can be achieved (a drop in transferability can be avoided) while preventing abnormal discharges from occurring.

Figure 7:
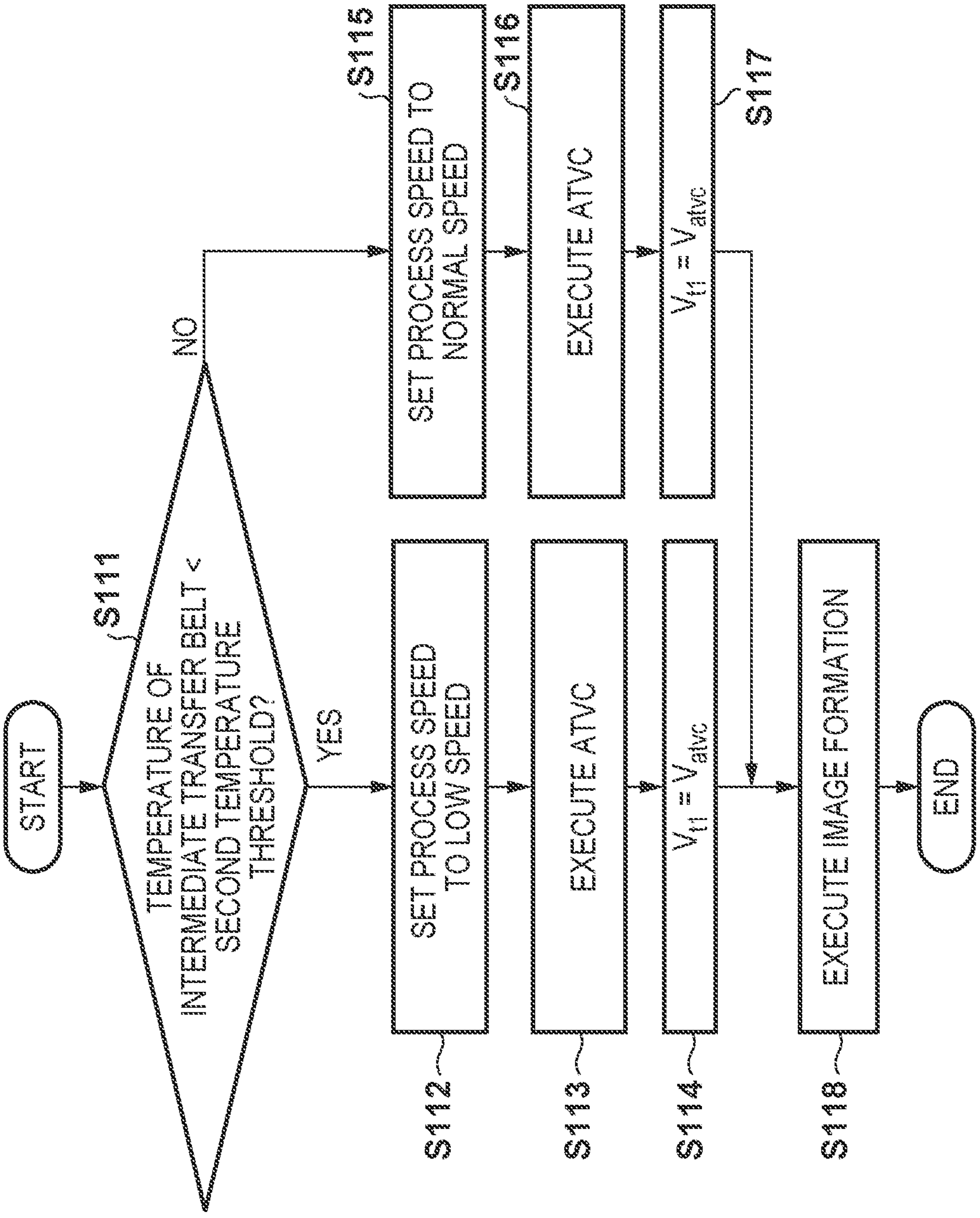
FIG. 7 is a flowchart illustrating a sequence of controlling a process speed (the first embodiment).

FIG. 7 is a flowchart illustrating a sequence for the above-described process speed control in the image forming apparatus 100 of the present embodiment. The processing in the sequence of FIG. 7 is executed by the control unit 80 in accordance with the start of execution of a print job.

In step S111, the control unit 80 obtains the temperature of the intermediate transfer belt 8, and determines whether the temperature is below the second temperature threshold. In the present embodiment, the second temperature threshold is set to 7° C., for example. However, the second temperature threshold is set as appropriate based on the configuration of the primary transfer unit, the material of the components thereof, the configuration of the intermediate transfer belt 8, and the like. Additionally, an estimated value obtained based on, for example, the temperature detected by the environmental sensor 40 is obtained as the temperature of the intermediate transfer belt 8. Note that the temperature of the intermediate transfer belt 8 may be measured using a contact-type or a non-contact-type thermometer. The control unit 80 moves the sequence to step S112 if the temperature of the intermediate transfer belt 8 is below the second temperature threshold, and to step S115 if the temperature of the intermediate transfer belt 8 is not below the second temperature threshold.

In step S112, the control unit 80 sets the process speed to a low speed (a second speed) that is slower than the normal speed (a first speed). In the present embodiment, the normal speed (the first speed) is set to 300 mm/s, and the low speed (the second speed) is set to 100 mm/s, for example. After the process speed is set, in step S113, the control unit 80 executes ATVC. Furthermore, in step S114, the control unit 80 sets a voltage $V_{atvc}$ determined through the execution of ATVC as a primary transfer voltage $V_{t1}$ used during image forming (when the print job is being executed), and then moves the sequence to step S118.

On the other hand, in step S115, the control unit 80 sets the process speed to the normal speed (the first speed). After the process speed is set, in step S116, the control unit 80 executes ATVC, similar to step S113. Furthermore, similar to step S114, in step S117, the control unit 80 sets the voltage $V_{atvc}$ determined through the execution of ATVC as the primary transfer voltage $V_{t1}$ used during image forming (when the print job is being executed), and then moves the sequence to step S118.

In step S118, the control unit 80 starts executing image formation using the set primary transfer voltage $V_{t1}$, and ends the processing of the sequence illustrated in FIG. 7. Note that after the process speed has been set to the low speed, the control unit 80 changes the process speed from the low speed to the normal speed once the temperature of the intermediate transfer belt 8 reaches the second temperature threshold.

<Effects of Fan Drive Control>

Figure 8:
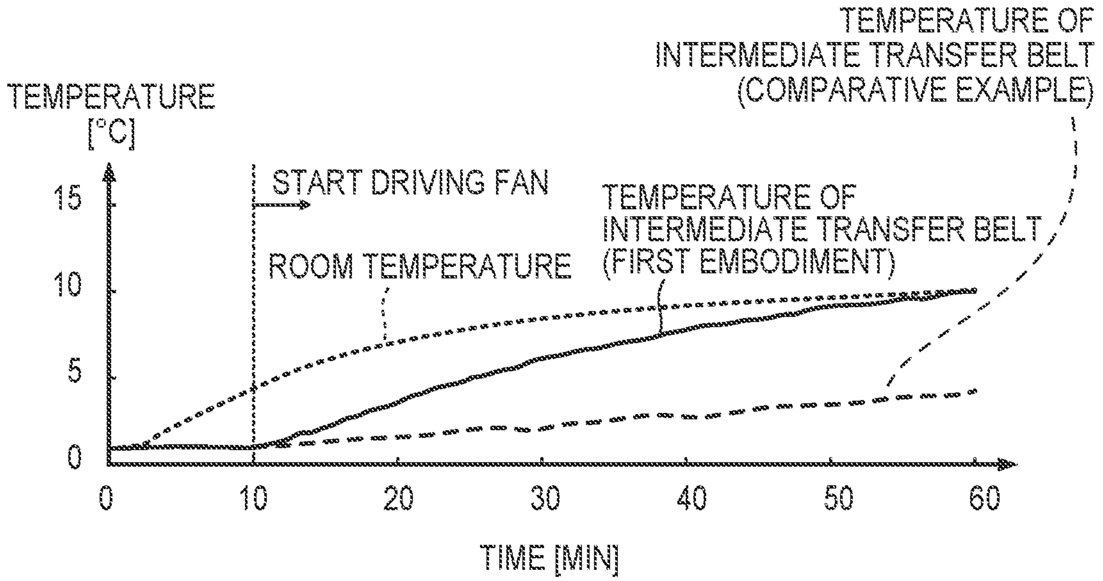
FIG. 8 is a diagram illustrating an example of transitions in room temperature and transitions in the temperature of the intermediate transfer belt.

Effects of the present embodiment will be described next with reference to FIG. 8. FIG. 8 is a diagram illustrating an example of transitions in room temperature and transitions in the temperature of the intermediate transfer belt 8 within the image forming apparatus 100 when the image forming apparatus 100 is installed in an office environment in a cold region, and the office environment is heated first thing in the morning. FIG. 8 illustrates transitions in the temperature of the intermediate transfer belt 8 when the power of the image forming apparatus 100 is turned on at the same time as the room starts being heated, and the drive control of the fan 70 according to the present embodiment (FIG. 6) is applied. Note that transitions in the temperature of the intermediate transfer belt 8 when the drive control of the fan 70 is not applied are illustrated as a comparative example. This comparative example corresponds to the example illustrated in FIG. 3.

In the example in FIG. 8, the control unit 80 obtains a temperature gradient value for the temperature detected by the environmental sensor 40 at a timing at which a unit of time (ten minutes, in this example) has passed from the timing at which the power of the image forming apparatus 100 was turned on (0 minutes). At this timing, the control unit 80 determines that the temperature detected by the environmental sensor 40 is less than the first temperature threshold (13° C., in this example) ("Yes" in step S101), and determines that the temperature gradient value of the detected temperature is greater than or equal to the first gradient threshold (1° C./ten minutes, in this example) ("Yes" in step S102). As a result, the control unit 80 starts driving the fan 70 to cause the temperature of the intermediate transfer belt 8 to rise (step S103). By starting to drive the fan 70, outside air begins being taken into the image forming apparatus 100 by driving the fan 70, and the inside of the image forming apparatus 100 can be efficiently heated by the outside air. As a result, the temperature of the intermediate transfer belt 8 is caused to rise, as illustrated in FIG. 8.

In the comparative example illustrated in FIG. 8, outside air is not taken into the image forming apparatus 100 by driving the fan 70. Accordingly, the temperature of the intermediate transfer belt 8 rises slowly over time. On the other hand, when, as in the present embodiment, outside air is taken into the image forming apparatus 100 by driving the fan 70, the temperature of the intermediate transfer belt 8 can be caused to rise faster than in the comparative example (the case where the fan 70 is not driven).

In the example in FIG. 8, the time required for the temperature of the intermediate transfer belt 8 to reach the second temperature threshold (7° C., in this example) is 92 minutes in the comparative example, but when the drive control of the fan 70 according to the present embodiment is applied, the time required is reduced to 34 minutes. This means that when the above-described process speed control (FIG. 7) is applied in order to prevent abnormal discharges from occurring at the primary transfer unit, the period in which it is necessary to change the process speed from the normal speed (e.g., 300 mm/s) to the low speed (e.g., 100 mm/s) can be shortened.

Note that the second temperature threshold corresponds to a temperature at which abnormal discharges no longer occur at the primary transfer unit in a case where the process speed is set to the normal speed and the primary transfer voltage is set based on ATVC. In this manner, the second temperature threshold is set based on the temperature of the intermediate transfer belt 8 at which an abnormal discharge occurs at the transfer position (the primary transfer unit), where toner images are transferred from the photosensitive drum 1, when the primary transfer voltage is determined through the constant current control described above. The normal speed and the low speed described above are set as appropriate based on the configuration of the image forming apparatus 100 and the like.

As described above, the image forming apparatus 100 of the present embodiment includes the image forming unit 30 that forms a toner image on the photosensitive drum 1 and the intermediate transfer belt 8 for transferring the toner image formed on the photosensitive drum 1 to a recording material. The image forming apparatus 100 further includes the fan 70 that takes outside air into the image forming apparatus 100 to produce an air flow for adjusting the temperature of the intermediate transfer belt 8, and an environmental sensor 40, which is a temperature detection device that detects the ambient temperature outside the image forming apparatus 100. The image forming apparatus 100 further includes the control unit 80 that controls the driving of the fan 70 based on the temperature detected by the environmental sensor 40. The control unit 80 drives the fan 70 in a case where the temperature detected by the environmental sensor 40 is less than or equal to the first temperature threshold and the temperature gradient value, which indicates a change in the detected temperature, is at least the first gradient threshold.

In this manner, the control unit 80 drives the fan 70 only when the temperature gradient value is at least the first gradient threshold and it is determined that the temperature of the outside air is rising (i.e., the inside of the image forming apparatus 100 can be warmed by the outside air). This makes it possible to efficiently raise the temperature of the intermediate transfer belt 8 by taking in outside air when the temperature thereof is rising and causing the temperature within the image forming apparatus 100 to rise. As a result, the period in which it is necessary to change the process speed from the normal speed to the low speed to ensure the transferability of the toner image at the primary transfer unit can be shortened. On the other hand, the control unit 80 does not drive the fan 70 when the temperature gradient value is less than the first gradient threshold and it is determined that the temperature of the outside air is not rising (i.e., the inside of the image forming apparatus 100 cannot be warmed by the outside air). This makes it possible to avoid consuming power wastefully by driving the fan 70.

As such, according to the present embodiment, driving the fan 70 for adjusting the temperature within the image forming apparatus 100 more efficiently makes it possible to ensure stable transferability while avoiding wasteful power consumption.

<Variations>

Many variations, such as those described hereinafter, can be made on the foregoing embodiment.

In the present embodiment, the fan 70 is constituted by an intake-type fan that takes outside air into the interior of the image forming apparatus 100, but the fan 70 may be constituted by an exhaust-type fan that exhausts air from within the image forming apparatus 100 to the outside. In this case, by using the fan 70 to exhaust the air inside the image forming apparatus 100 to the outside and taking in outside air into the apparatus through an opening such as a discharge port for the recording material S, the temperature (of the intermediate transfer belt 8) in the image forming apparatus 100 can be adjusted, in a similar manner as when using an intake-type fan.

Additionally, a metal roller is used as the primary transfer roller 6 in the present embodiment. As illustrated in FIGS. 1A and 5, a configuration is used in which the primary transfer roller 6 is disposed downstream, in the movement direction of the intermediate transfer belt 8, from the transfer position at which toner images are transferred from the photosensitive drum 1 to the intermediate transfer belt 8. However, the configuration of the primary transfer unit is not limited to such a configuration, and may be a different configuration. For example, a foam-covered elastic roller in which an elastic foam layer is formed around a shaft made of a metal such as SUS (stainless steel) may be used as the primary transfer roller 6. Such a foam-covered elastic roller may be used as the primary transfer roller 6, and a configuration in which the primary transfer roller 6 is disposed in a position opposite the photosensitive drum 1 with the intermediate transfer belt 8 therebetween may be used.

Even when such a configuration is used, fluctuations in the resistance value at the primary transfer unit caused by changes in the temperature within the image forming apparatus 100 can occur, as described above. Accordingly, by applying the drive control of the fan 70 and the control of the process speed according to the present embodiment, similar effects can be achieved in an embodiment that employs a configuration such as that described here.

Additionally, although the intermediate transfer belt 8 is constituted by an ion-conducting material in the present embodiment, the belt may be constituted by an electron-conductive material instead. When an electron-conductive material is used for the intermediate transfer belt 8, generally speaking, fluctuations in the electrical resistance caused by changes in the environment (temperature and humidity) are suppressed, while the rise in electrical resistance caused by changes in the durability of the intermediate transfer belt 8, occurring when the image forming processing is executed, increases. Even when an electron-conductive material is used for the intermediate transfer belt 8, the electrical resistance of the intermediate transfer belt 8 can fluctuate according to temperature changes in the environment in which the image forming apparatus 100 is installed, similar to when an ion-conducting material is used. Accordingly, effects similar to those of the present embodiment can be achieved in an embodiment that uses such a configuration.

Second Embodiment

A second embodiment of the present disclosure will be described next. The basic configuration and operations of the image forming apparatus 100 of the present embodiment are similar to those of the image forming apparatus of the first embodiment. In the following, parts that are the same as in the first embodiment will not be described, with descriptions focusing primarily on parts that are different from those in the first embodiment.

The first embodiment described an example in which the process speed is lowered from the normal speed to the low speed (e.g., 100 mm/s) to ensure sufficient transferability while preventing abnormal discharges from occurring at the primary transfer unit when the temperature of the intermediate transfer belt falls below the second temperature threshold (e.g., 7° C.). The present embodiment will describe an example in which sufficient transferability is ensured by setting the primary transfer voltage to a value greater than the voltage value determined through ATVC, without lowering the process speed, when the temperature of the intermediate transfer belt is below the second temperature threshold.

The first embodiment described a discharge mark appearing as density unevenness in the toner image formed when an abnormal discharge occurs at the primary transfer unit, but depending on the input image for image formation, an abnormal discharge may not easily appear as density unevenness. Specifically, the inventors clarified through experiments that when the input image includes a half-tone region and a solid image region, the discharge mark appears as density unevenness in the half-tone region, whereas in the solid image region, the discharge mark does not easily appear as density unevenness. Here, a "solid image region" is an image region having a maximum density level. Meanwhile, a "half-tone region" is an image region having a density level within a specific range (when the amount of toner used to form the solid image region is taken as 100%, an image region formed using a toner amount ranging from 10% to 80%, for example).

Accordingly, the image forming apparatus 100 of the present embodiment has a speed priority mode, in which image forming is executed having set the process speed to the normal speed when an input image in which such abnormal discharges do not easily appear is the image to be formed. As will be described hereinafter, in the speed priority mode, the primary transfer voltage is set to a value greater than the voltage value determined through ATVC, which makes it possible to ensure sufficient transferability at the primary transfer unit.

Figure 9:
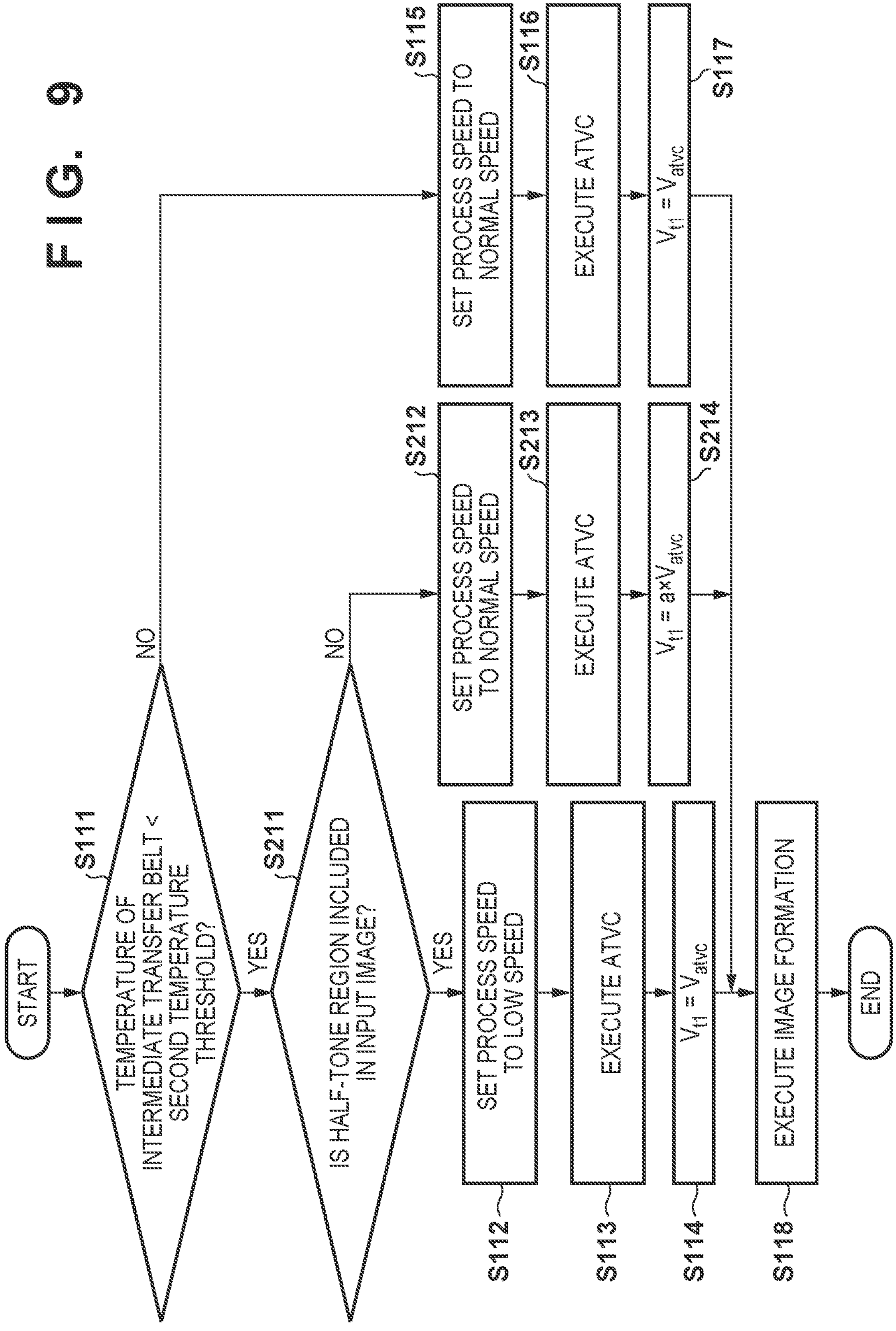
FIG. 9 is a flowchart illustrating a sequence of controlling the process speed (a second embodiment).

FIG. 9 is a flowchart illustrating a sequence for process speed control in the image forming apparatus 100 of the present embodiment. The processing in the sequence of FIG. 9 is executed by the control unit 80 in accordance with the start of execution of a print job when the speed priority mode is set. For example, the image forming apparatus 100 may be configured to set the speed priority mode only when the user has made a setting operation through a console of the image forming apparatus 100, or may be configured to set the speed priority mode at all times regardless of user operations.

In step S111, the control unit 80 obtains the temperature of the intermediate transfer belt 8, and determines whether the temperature is below the second temperature threshold (7° C., in this example), in the same manner as in the first embodiment (FIG. 7). The control unit 80 moves the sequence to step S115 if the temperature of the intermediate transfer belt 8 is not below the second temperature threshold, and then, in steps S115 to S118, performs the same processing as in the first embodiment. On the other hand, the control unit 80 moves the sequence to step S211 if the temperature of the intermediate transfer belt 8 is below the second temperature threshold.

In step S211, the control unit 80 determines whether the input image includes a half-tone region based on the input image data which is output from the image processing unit 110 and used for image formation. If the input image includes a half-tone region, the control unit 80 moves the sequence to step S112, and then, in steps S112 to S118, performs the same processing as in the first embodiment. On the other hand, if the input image does not include a half-tone region, the control unit 80 moves the sequence to step S212.

In step S212, the control unit 80 sets the process speed to the normal speed (the first speed), similar to step S115. In the present embodiment, the normal speed (the first speed) is set to 300 mm/s, and the low speed (the second speed) is set to 100 mm/s, for example. After the process speed is set, in step S213, the control unit 80 executes ATVC, similar to step S116.

Furthermore, in step S214, the control unit 80 sets a value obtained by multiplying the voltage $V_{atvc}$, which is determined through the execution of ATVC, by a predetermined coefficient a, as the primary transfer voltage $V_{t1}$ used during image forming (when the print job is being executed), and then moves the sequence to step S118. In step S118, the control unit 80 starts executing image formation using the set primary transfer voltage $V_{t1}$, and ends the processing of the sequence illustrated in FIG. 9, similar to the first embodiment.

The coefficient a used in step S214 is set as appropriate such that the value a is greater than 1, based on the configuration of the primary transfer unit, and the primary transfer voltage $V_{t1}$ is therefore set to a value greater than the voltage $V_{atvc}$ determined by executing ATVC. For example, a is set to 1.1. Accordingly, even if the temperature of the intermediate transfer belt is below the second temperature threshold, if the input image does not include a half-tone region, images can be formed without reducing the process speed while ensuring sufficient transferability of toner images.

As described above, the image forming apparatus 100 of the present embodiment has a speed priority mode, in which image forming is executed having set the process speed to the normal speed when an input image in which discharge marks do not easily appear, even when abnormal discharges occur, is the image to be formed. In the speed priority mode, if the input image does not include a half-tone region, the control unit 80 sets the primary transfer voltage to a voltage higher than the voltage determined through the execution of ATVC, after which images are formed. Through this, even when the temperature of the intermediate transfer belt 8 is low, images can be formed having set the process speed to the normal speed while ensuring sufficient transferability of toner images, according to the input image (that is, images can be formed having prioritized the process speed). Furthermore, situations where the process speed is lowered in order to maintain the transferability of toner images can be reduced compared to the first embodiment, which makes it possible to improve the usability.

Third Embodiment

A third embodiment of the present disclosure will be described next. The basic configuration and operations of the image forming apparatus 100 of the present embodiment are similar to those of the image forming apparatus of the first embodiment. In the following, parts that are the same as in the first embodiment will not be described, with descriptions focusing primarily on parts that are different from those in the first embodiment.

The present embodiment will describe an example in which whether to execute the control described in the foregoing first or second embodiment is determined based on the resistance value at the primary transfer unit. The resistance at the primary transfer unit portion corresponds to the electrical resistance between the primary transfer roller 6 and the photosensitive drum 1. In the present embodiment, the resistance value of the primary transfer unit is found using the voltage value of the primary transfer voltage applied to the primary transfer roller 6 by the voltage application unit 62 and the current value of the primary transfer current detected by the current detection unit 63. Specifically, the resistance value at the primary transfer unit is obtained as the voltage value of the primary transfer voltage divided by the current value of the primary transfer current.

Figure 10:
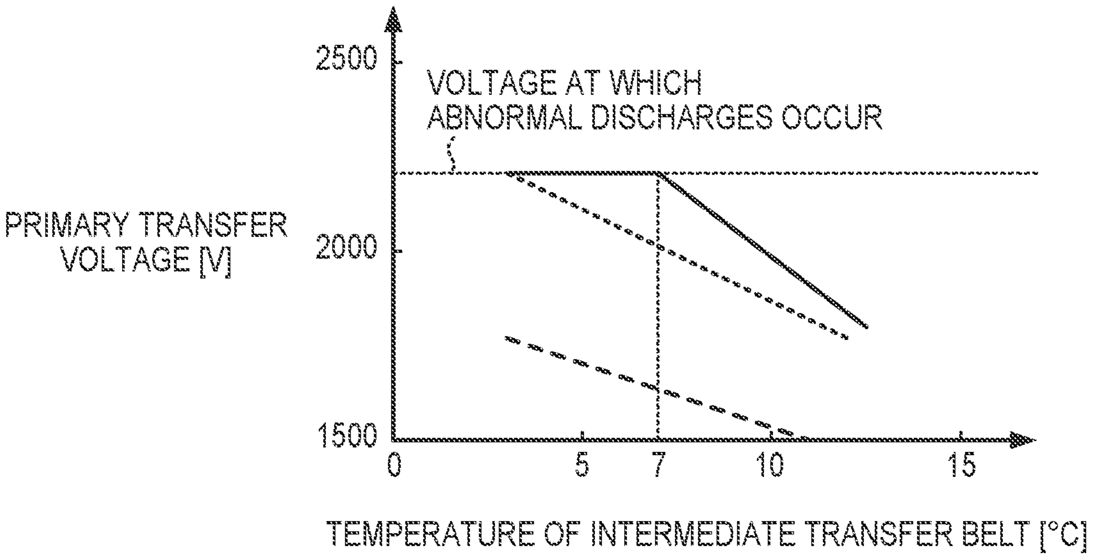
FIG. 10 illustrates an example of a relationship between the temperature of the intermediate transfer belt and a primary transfer voltage (a third embodiment).

The resistance value at the primary transfer unit (in the present embodiment, mainly the electrical resistance value of the intermediate transfer belt 8) varies depending on variations in performance, the durability, and the like of the intermediate transfer belt 8. FIG. 10 illustrates an example of a relationship between the temperature of the intermediate transfer belt 8 and the primary transfer voltage determined through ATVC. In FIG. 10, the broken line represents the characteristics of the intermediate transfer belt 8 when the image forming apparatus 100 is shipped as a produce (in a new state), and the dotted line represents the characteristics of the intermediate transfer belt 8 after 100,000 A4-sized sheets have been used to form images. The solid line represents the characteristics of the intermediate transfer belt 8 after 180,000 A4-size sheets have been used to form images.

In the example in FIG. 10, the target current value for the primary transfer current when performing ATVC is set to a constant 16 μA, and the primary transfer voltage is determined through ATVC. Accordingly, the higher the primary transfer voltage determined by ATVC is, the higher the resistance value at the primary transfer unit becomes. The electrical resistance value of the intermediate transfer belt 8 increases as the total number of images formed using the intermediate transfer belt 8 increases. Accordingly, as illustrated in FIG. 10, the electrical resistance value of the intermediate transfer belt 8 increases as the total number of images formed using the intermediate transfer belt 8 increases, and the primary transfer voltage determined through ATVC increases accordingly.

Furthermore, as indicated by the solid line in FIG. 10, in a temperature region where the temperature of the intermediate transfer belt 8 is low, the primary transfer voltage is limited to less than or equal to a voltage value at which abnormal discharges occur (2200 V, in this example), as described in the first embodiment. Limiting the primary transfer voltage in this manner prevents the primary transfer current necessary for maintaining the transferability of toner images at the primary transfer unit from flowing in the primary transfer unit, which results in a drop in the transferability of toner images.

In the present embodiment, focusing on such characteristics of the intermediate transfer belt 8, the resistance value at the primary transfer unit is detected, and whether to perform the control described in the foregoing first or second embodiment is determined based on the result of the detection. Here, an example is assumed in which, when an image is formed having set the process speed to the normal speed (e.g., 300 mm/s) while the temperature of the intermediate transfer belt 8 is low, an abnormal discharge occurs when the primary transfer voltage exceeds 2,200 V. In this example, assuming the target current value of the primary transfer current when performing ATVC is 16 μA, the resistance value at the primary transfer unit corresponding to the primary transfer voltage of 2,200 V is 137 MΩ, or in other words, an abnormal discharge occurs when the resistance value at the primary transfer unit exceeds 137 MΩ.

Accordingly, in the present embodiment, the control unit 80 sets a threshold (resistance threshold) $R_{th1}$ for the resistance value at the primary transfer unit, within a range that does not exceed the resistance value at the primary transfer unit at which abnormal discharges occur (137 MΩ, in the above example). Furthermore, the control unit 80 executes the control described in the first or second embodiment only when the resistance value at the primary transfer unit is at least $R_{th1}$. The resistance threshold $R_{th1}$ is set as appropriate in accordance with the configuration of an image forming apparatus and the like. For example, the resistance threshold $R_{th1}$ may be set to a value (e.g., 132 MΩ) lower than the resistance value at the primary transfer unit at which the aforementioned abnormal discharges occur (137 MΩ, in the above example), in anticipation of error in the detection of the resistance value at the primary transfer unit.

As in the first embodiment, the image forming apparatus 100 of the present embodiment determines the primary transfer voltage by executing ATVC during advance rotation operations when executing a print job. Accordingly, the image forming apparatus 100 can detect the resistance value at the primary transfer unit in accordance with the determination of the primary transfer voltage. Based on the primary transfer voltage (and the target current value of the primary transfer current) determined through ATVC, the control unit 80 performs resistance detection for detecting a resistance value $R_{t1}$ at the primary transfer unit. The detected resistance value $R_{t1}$ is stored in a non-volatile storage device (not shown) such as an HDD (hard disk drive) or the like provided in the image forming apparatus 100. $R_{t1}$ stored in the storage device can be updated each time a print job is executed.

<Fan Drive Control>

Figure 11:
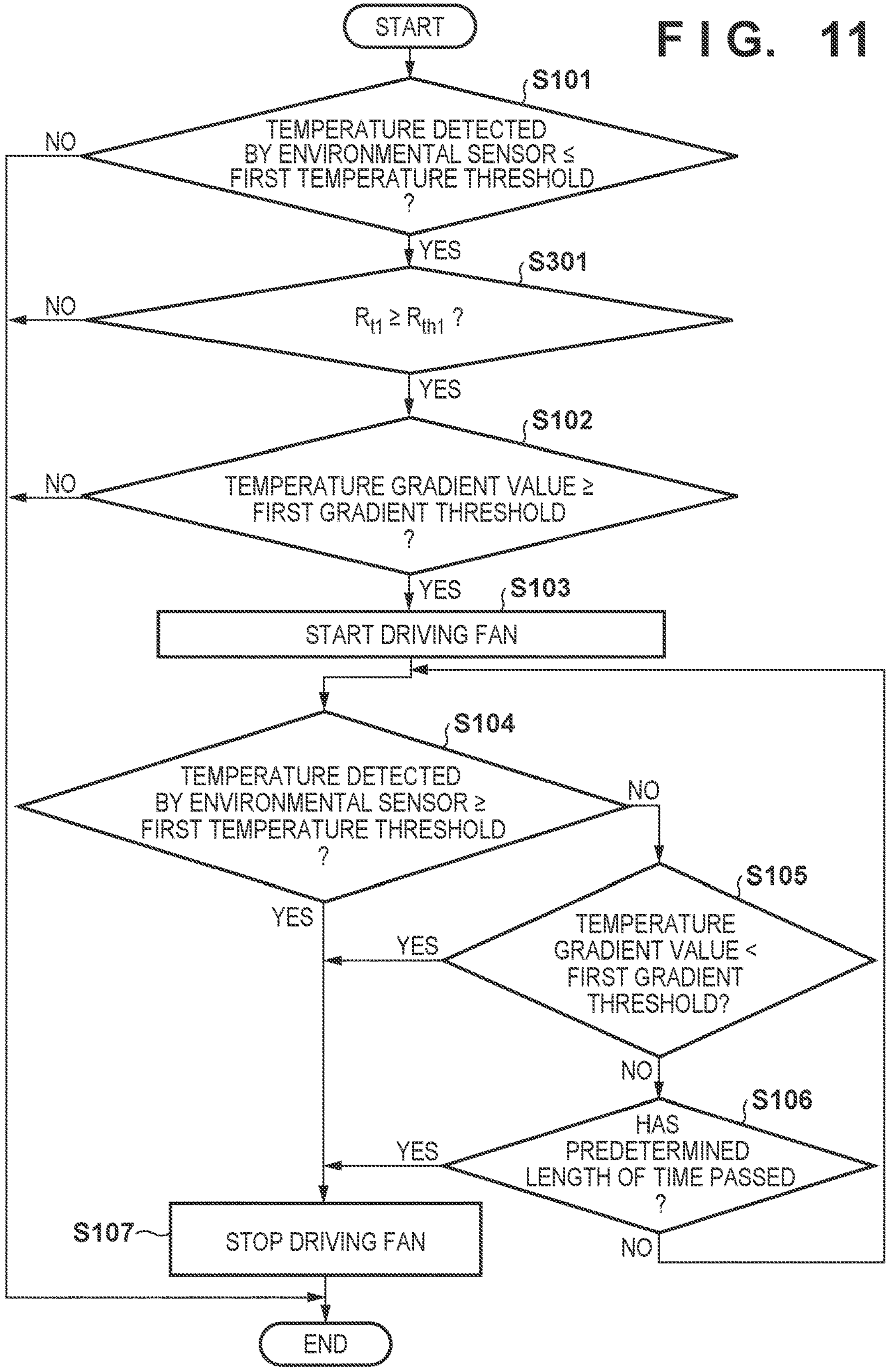
FIG. 11 is a flowchart illustrating a sequence of fan drive control (the third embodiment).

FIG. 11 is a flowchart illustrating a sequence of drive control of the fan 70 in the image forming apparatus 100 of the present embodiment.

In step S101, the control unit 80 determines whether the temperature detected by the environmental sensor 40 is less than or equal to a first temperature threshold (13° C., in this example), similar to the first embodiment (FIG. 6). If the temperature detected by the environmental sensor 40 is less than or equal to the first temperature threshold, the sequence moves to step S301, whereas if the temperature is not less than or equal to the first temperature threshold, the control unit 80 ends the processing without driving the fan 70.

In step S301, the control unit 80 determines whether the resistance value $R_{t1}$ at the primary transfer unit is at least the resistance threshold $R_{th1}$. As described above, the resistance value $R_{t1}$ is obtained during advance rotation operations in the print job, is stored in the storage device, and is obtained from the storage device. If the resistance value $R_{t1}$ is not at least the resistance threshold $R_{th1}$ (the detected resistance value $R_{t1}$ is lower than the resistance threshold Rini), the control unit 80 ends the processing without driving the fan 70. On the other hand, if the resistance value $R_{t1}$ is at least the resistance threshold $R_{th1}$, the control unit 80 moves the sequence to step S102, and then performs the processing of steps S102 to S107, in the same manner as in the first embodiment. In other words, when the temperature gradient value of the temperature detected by the environmental sensor 40 is at least the first gradient threshold, the control unit 80 drives the fan 70, and stops driving the fan 70 in accordance with conditions for stopping the driving of the fan 70.

In this manner, in the present embodiment, the control unit 80 determines whether to control the driving of the fan 70 based on the resistance value at the primary transfer unit (mainly the resistance value of the intermediate transfer belt 8), and controls the driving of the fan 70 in accordance with that determination. This makes it possible to control the driving of the fan 70 only when necessary in a state where the temperature of the intermediate transfer belt 8 is low (a case where the resistance value $R_{t1}$ is high and the primary transfer voltage may be limited in ATVC). In this manner, driving the fan 70 only when necessary makes it possible to avoid unnecessary power consumption caused by driving the fan 70.

<Control of Process Speed>

In the first embodiment, the process speed is lowered from the normal speed to the low speed (e.g., 100 mm/s) to ensure the transferability of toner images when it is assumed, based on the temperature of the intermediate transfer belt, that the transferability of toner images at the primary transfer unit will be insufficient. As will be described below, in the present embodiment, a condition that the resistance value $R_{t1}$ at the primary transfer unit is at least the resistance threshold $R_{th1}$ is added as a condition for reducing the process speed.

Figure 12A:
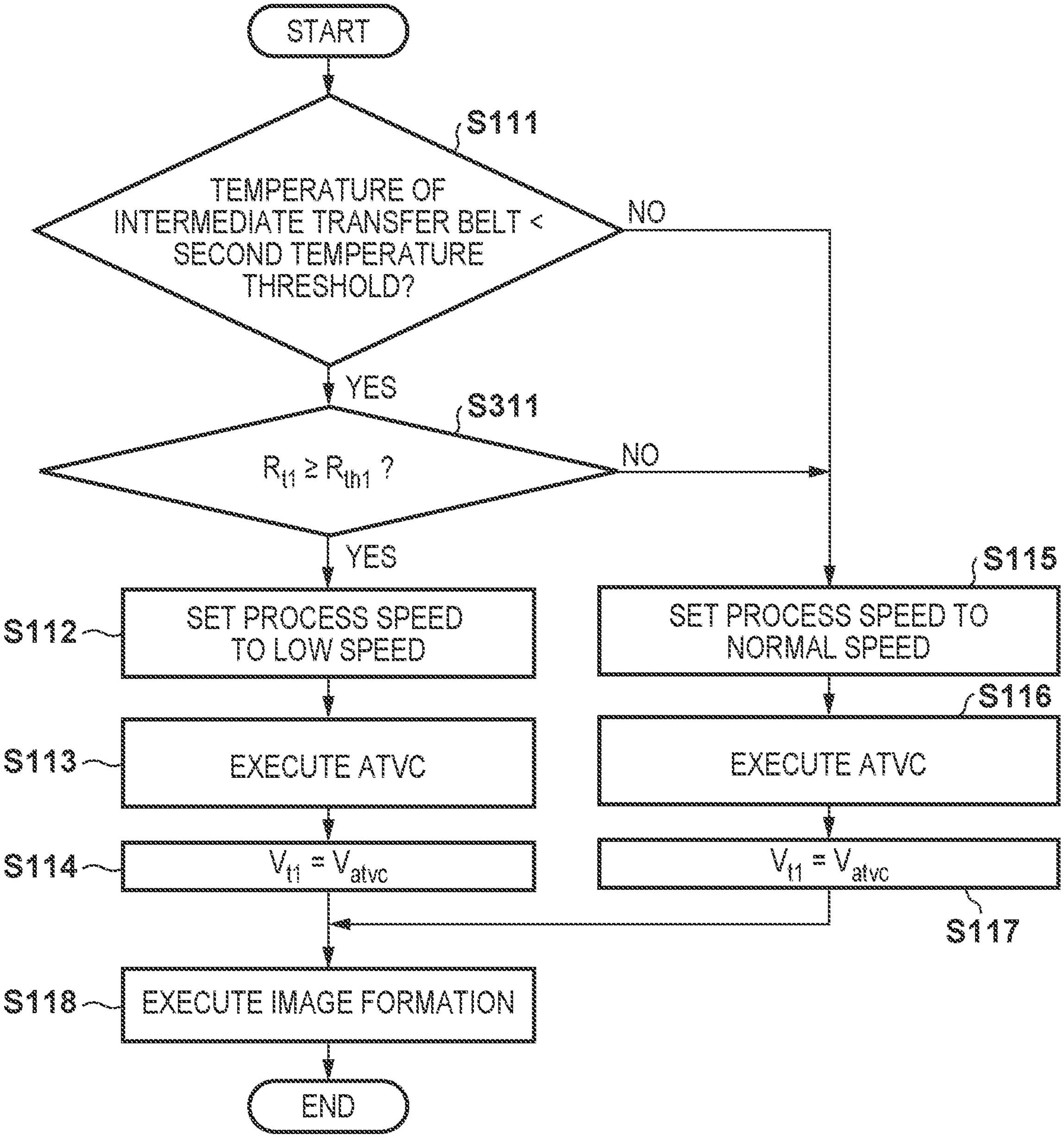
FIGS. 12A and 12B are flowcharts illustrating a sequence of controlling the process speed (the third embodiment).

FIG. 12A is a flowchart illustrating a sequence for process speed control in the image forming apparatus 100 of the present embodiment. The processing in the sequence of FIG. 12A is executed by the control unit 80 in accordance with the start of execution of a print job.

In step S111, the control unit 80 obtains the temperature of the intermediate transfer belt 8, and determines whether the temperature is below the second temperature threshold (7° C., in this example), in the same manner as in the first embodiment (FIG. 7). The control unit 80 moves the sequence to step S115 if the temperature of the intermediate transfer belt 8 is not below the second temperature threshold, and then, in steps S115 to S118, performs the same processing as in the first embodiment. On the other hand, the control unit 80 moves the sequence to step S311 if the temperature of the intermediate transfer belt 8 is below the second temperature threshold.

In step S311, the control unit 80 determines whether the resistance value $R_{t1}$ at the primary transfer unit is at least the resistance threshold $R_{th1}$. The resistance value $R_{t1}$ is obtained during advance rotation operations in the previous print job, is stored in the storage device, and is obtained from the storage device. If the resistance value $R_{t1}$ is not at least the resistance threshold $R_{th1}$, the control unit 80 moves the sequence to step S115, and then performs the processing of steps S115 to S118, in the same manner as in the first embodiment. In other words, the control unit 80 sets the process speed to the normal speed (the first speed) rather than reducing the process speed, and starts executing image formation.

On the other hand, if the resistance value $R_{t1}$ is at least the resistance threshold $R_{th1}$, the control unit 80 moves the sequence from step S311 to step S112, and then performs the processing of steps S112 to S114 and S118, in the same manner as in the first embodiment. In other words, the control unit 80 reduces the process speed from the normal speed (the first speed) to the low speed (the second speed), and starts executing image formation.

In this manner, in the present embodiment, the control unit 80 determines whether to reduce the process speed based on the resistance value at the primary transfer unit (mainly the resistance value of the intermediate transfer belt 8). Through this, situations where the process speed is lowered in order to maintain the transferability of toner images can be reduced compared to the first embodiment, which makes it possible to improve the usability.

Note that ATVC for detecting the resistance value $R_{t1}$ at the primary transfer unit may be performed during preparatory operations after the power of the image forming apparatus 100 has been turned on. Alternatively, ATVC may be performed when the image forming apparatus 100 has resumed operating after a long pause (e.g., after six hours have passed). Executing ATVC at such a timing makes it possible to more accurately detect the resistance value $R_{t1}$ at the primary transfer unit. As a result, the determination of step S301 in the sequence illustrated in FIG. 11 and the determination of step S311 in the sequence illustrated in FIG. 12A can be performed more appropriately.

Although the resistance value $R_{t1}$ obtained during the advance rotation operations in the previous print job is used in step S311 in the sequence illustrated in FIG. 12A, the resistance value $R_{t1}$ may be obtained at a different timing. The following will describe an example in which the resistance value $R_{t1}$ at the primary transfer unit is detected, and the process speed is controlled, based on the result of ATVC executed during the advance rotation operations in the print job to be executed.

Figure 12B:
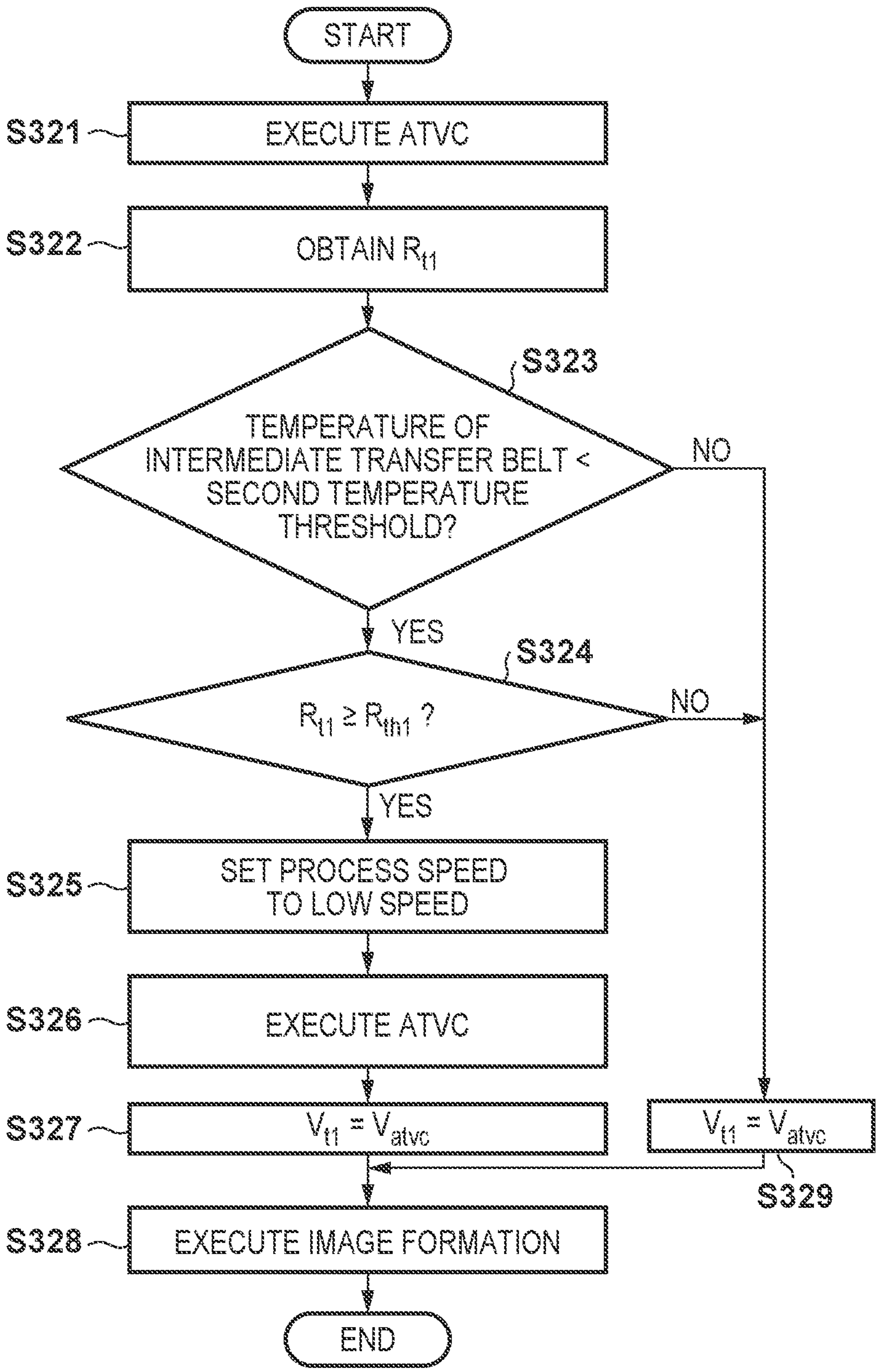

FIG. 12B is a flowchart illustrating a sequence, different from that illustrated in FIG. 12A, for process speed control in the image forming apparatus 100 of the present embodiment. The processing in the sequence of FIG. 12B is executed by the control unit 80 in accordance with the start of execution of a print job.

In step S321, the control unit 80 sets the process speed to the normal speed (the first speed) and starts executing the print job, and executes ATVC during the advance rotation operations thereof. Then, in step S322, the control unit 80 obtains the resistance value $R_{t1}$ at the primary transfer unit using the voltage $V_{atvc}$ (and the target current value of the primary transfer current) determined by executing ATVC, and then moves the sequence to step S323.

In step S323, the control unit 80 obtains the temperature of the intermediate transfer belt 8, and determines whether the temperature is below the second temperature threshold (7° C., in this example), in the same manner as in step S111. The control unit 80 moves the sequence to step S329 if the temperature of the intermediate transfer belt 8 is not below the second temperature threshold. On the other hand, the control unit 80 moves the sequence to step S324 if the temperature of the intermediate transfer belt 8 is below the second temperature threshold.

In step S324, the control unit 80 determines whether the resistance value $R_{t1}$ obtained in step S322 is at least the resistance threshold $R_{th1}$. The control unit 80 moves the sequence to step S325 if the resistance value $R_{t1}$ is at least the resistance threshold $R_{th1}$, and moves the sequence to step S329 if the resistance value Ru is not at least the resistance threshold $R_{th1}$.

In step S329, similar to step S114, the control unit 80 sets the voltage $V_{atvc}$ determined through the execution of ATVC as the primary transfer voltage $V_{t1}$ used during image forming (when the print job is being executed), and then moves the sequence to step S328. In step S328, the control unit 80 starts executing image formation without changing the process speed from the normal speed (the first speed), using the set primary transfer voltage $V_{t1}$, and ends the processing of the sequence illustrated in FIG. 12B.

On the other hand, if the sequence has moved from step S324 to step S325, in step S325, the control unit 80 sets the process speed to a low speed (a second speed) that is slower than the normal speed (a first speed), similar to step S112. After the process speed is set, in step S326, the control unit 80 executes ATVC, similar to step S113. Furthermore, similar to step S114, in step S327, the control unit 80 sets the voltage $V_{atvc}$ determined through the execution of ATVC as the primary transfer voltage $V_{t1}$ used during image forming (when the print job is being executed), and then moves the sequence to step S328. In step S328, the control unit 80 starts executing image formation having set the process speed to the low speed (the second speed), using the set primary transfer voltage $V_{t1}$, and ends the processing of the sequence illustrated in FIG. 12B.

In this manner, according to the sequence in FIG. 12B, the resistance value $R_{t1}$ at the primary transfer unit is detected, and the process speed is controlled, based on the result of ATVC executed during the advance rotation operations in the print job to be executed. This makes it possible to control (select) the process speed more accurately.

As described above, the image forming apparatus 100 of the present embodiment makes determinations related to the drive control of the fan 70 and the control of the process speed, as described in the foregoing first and second embodiments, based on the resistance value at the primary transfer unit. As a result, driving of the fan 70 can be controlled only when necessary, when the temperature of the intermediate transfer belt 8 is low, and unnecessary power consumption caused by driving the fan 70 can be avoided. Furthermore, situations where the process speed is lowered in order to maintain the transferability of toner images can be reduced, which makes it possible to improve the usability.

Fourth Embodiment

A fourth embodiment of the present disclosure will be described next. The basic configuration and operations of the image forming apparatus 100 of the present embodiment are similar to those of the image forming apparatus of the first embodiment. In the following, parts that are the same as in the first embodiment will not be described, with descriptions focusing primarily on parts that are different from those in the first embodiment.

In the present embodiment, when using an air conditioner to cool an office environment located in a warm region first thing in the morning, and the temperature in the image forming apparatus 100 is assumed to be higher than the temperature of the outside air, the outside air is taken into the image forming apparatus 100 by driving the fan 70. The intake of outside air causes the temperature within the image forming apparatus 100 to drop, which in turn causes the temperature of the intermediate transfer belt 8 to drop. This shortens a period in which the transferability of toner images drops due to the intermediate transfer belt 8 being in a high-temperature state.

When an image forming apparatus 100 is installed in an office environment in a warm region and that office environment is cooled first thing in the morning as mentioned above, the transferability of toner images at the primary transfer unit may be insufficient for the following reasons. In this case, although the room temperature drops due to the cooling, the temperature in the image forming apparatus 100 drops more gradually than the room temperature (i.e., the interior of the image forming apparatus 100 is cooled gradually). Accordingly, a state in which the temperature of the intermediate transfer belt 8 is high (a state in which the resistance value of the intermediate transfer belt 8 is low) continues for a long period of time.

Figure 13A:
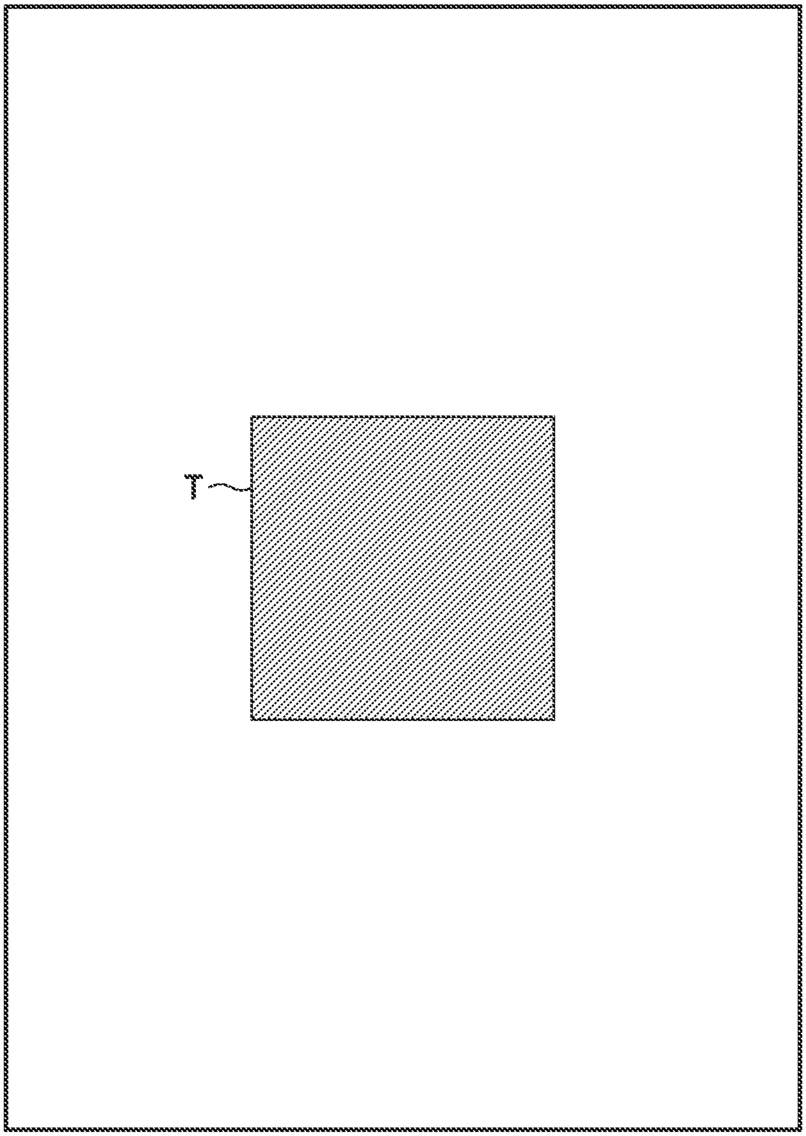
FIG. 13A is a schematic diagram illustrating an example of a toner image that is formed.
Figure 13B:
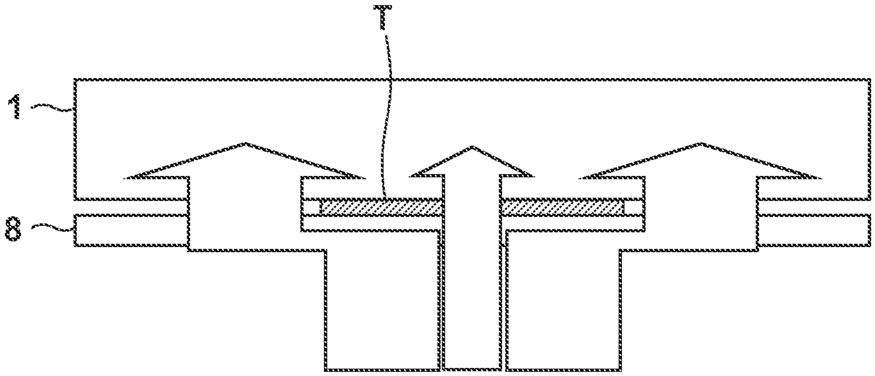
FIG. 13B is a schematic diagram illustrating an example of a path through which primary transfer current flows (a fourth embodiment).

In a state where the electrical resistance of the intermediate transfer belt 8 is low as described above, when a toner image T constituted by a solid image having broad margins, such as that illustrated in FIG. 13A, for example, is transferred from the photosensitive drum 1 to the intermediate transfer belt 8, the transferability will drop (transfer defects occur). Here, FIG. 13B is a schematic diagram illustrating an example of a path through which a primary transfer current flows when the toner image T illustrated in FIG. 13A is transferred from the photosensitive drum 1 to the intermediate transfer belt 8 at the primary transfer unit, as a cross-sectional view seen from the movement direction of the intermediate transfer belt 8. The arrows in FIG. 13B schematically indicate the path through which the primary transfer current flows, and the thickness of the arrows schematically indicates the magnitude of the current flowing.

In a state where the electrical resistance of the intermediate transfer belt 8 is low, when the toner image T reaches the primary transfer unit as illustrated in FIG. 13B, the electrical resistance in a non-toner image region, where the toner image T is not present, is lower than the electrical resistance of a toner image region, where the toner image T is present. Accordingly, as indicated by the arrows in FIG. 13B, a primary transfer current of a magnitude corresponding to such an electrical resistance selectively flows to the toner image region and the non-toner image region. In other words, the primary transfer current is greater in the non-toner image region than in the toner image region. As a result, a transfer defect occurs in which the toner image T is not transferred sufficiently to the intermediate transfer belt 8.

Such transfer defects can be suppressed by increasing the primary transfer voltage value. However, when the primary transfer voltage is increased, image defects such as pinholes occur, especially in images including half-tone regions, due to discharge generated between the intermediate transfer belt 8 and the photosensitive drum 1. Such a phenomenon is pronounced in a high-temperature environment where the resistance value at the primary transfer unit (mainly the resistance value of the intermediate transfer belt 8) is reduced.

Accordingly, in the present embodiment, by controlling the driving of the fan 70 as described above, and taking outside air into the image forming apparatus 100, the interior of the image forming apparatus 100 can be cooled, and the temperature of the intermediate transfer belt 8 can be caused to drop. This shortens a period in which the transferability of toner images drops (transfer defects occur) as described above due to the intermediate transfer belt 8 being in a high-temperature state.

<Fan Drive Control>

Figure 14:
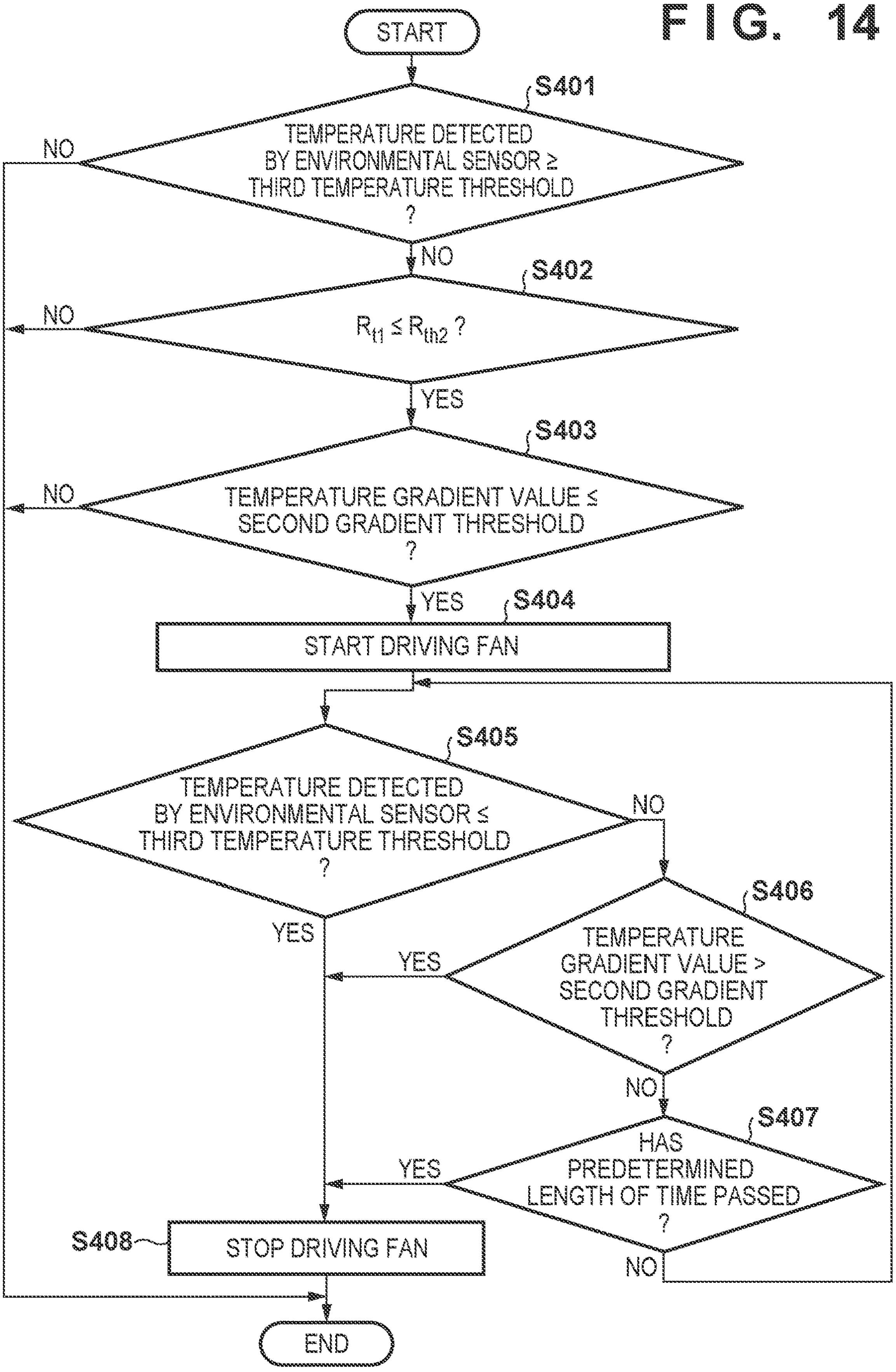
FIG. 14 is a flowchart illustrating a sequence of fan drive control (the fourth embodiment).

FIG. 14 is a flowchart illustrating a sequence of drive control of the fan 70 in the image forming apparatus 100 of the present embodiment.

In step S401, the control unit 80 determines whether the temperature detected by the environmental sensor 40 is at least a third temperature threshold. In the present embodiment, the third temperature threshold is set to 32° C., for example. Whether the image forming apparatus 100 is currently in a high-temperature environment is determined as a result of this determination. If the temperature detected by the environmental sensor 40 is at least the third temperature threshold, the control unit 80 moves the sequence to step S402, whereas if the temperature is not at least the third temperature threshold, the control unit 80 ends the processing without driving the fan 70.

In step S402, the control unit 80 determines whether the resistance value $R_{t1}$ at the primary transfer unit is less than or equal to a resistance threshold $R_{th2}$. The resistance threshold $R_{th2}$ is set in advance such that whether the resistance value $R_{t1}$ at the primary transfer unit is a resistance value within a range in which the transferability of toner images drops, as described above, can be determined. For example, the threshold $R_{th2}$ is set to 40 MΩ. If the resistance value $R_{t1}$ is not less than or equal to the resistance threshold $R_{th2}$, the control unit 80 ends the processing without driving the fan 70. On the other hand, if the resistance value $R_{t1}$ is less than or equal to the resistance threshold $R_{th2}$, the control unit 80 moves the sequence to step S403.

In step S403, the control unit 80 determines whether a temperature gradient value (temperature gradient) of the temperature detected by the environmental sensor 40 is less than or equal to a predetermined second gradient threshold. The temperature gradient value can be obtained as a temperature drop amount in a unit of time. For example, the value of a difference between the current temperature detected by the environmental sensor 40 and the temperature detected a unit of time earlier is obtained as the temperature gradient value. In one example, the aforementioned unit of time is set to ten minutes, and the second gradient threshold is set to −1° C. (i.e., a temperature drop of 1° C. every ten minutes). The control unit 80 moves the sequence to step S404 if the temperature gradient value is less than or equal to the second gradient threshold, and ends the processing if the temperature gradient value is not less than or equal to the second gradient threshold.

Whether the temperature outside the image forming apparatus 100 is dropping is determined through the determination of step S403. If the temperature outside the image forming apparatus 100 (the temperature of the outside air) is not dropping, the inside of the image forming apparatus 100 cannot be cooled by air taken in even if the fan 70 is driven and the outside air is taken into the image forming apparatus 100. On the other hand, if the temperature outside the image forming apparatus 100 (the temperature of the outside air) is dropping, the inside of the image forming apparatus 100 can be cooled by air taken in, by driving the fan 70 and taking the outside air into the image forming apparatus 100. In this manner, it is possible to drive the fan 70 only when the interior of the image forming apparatus 100 can be cooled by the outside air, which makes it possible to avoid consuming power needlessly by driving the fan 70.

Accordingly, in the present embodiment, when the temperature gradient value of the temperature detected by the environmental sensor 40 is less than or equal to the second gradient threshold, the control unit 80 moves the sequence from step S403 to step S404, and starts driving the fan 70, to cool the interior of the image forming apparatus 100. This brings outside air into the image forming apparatus 100, causing the temperature inside the apparatus to drop.

When the driving of the fan 70 is started, the control unit 80 moves the sequence to step S405, and determination processing of steps S405 to S407 is performed. In this determination processing, whether a condition for stopping the driving of the fan 70 has been met is determined. The control unit 80 moves the sequence to step S408 when any of the conditions specified in steps S405 to S407 are met, and stops driving the fan 70.

Specifically, in step S405, the control unit 80 determines whether the temperature detected by the environmental sensor 40 is less than or equal to the third temperature threshold, moves the sequence to step S408 if the detected temperature is less than or equal to the third temperature threshold, and moves the sequence to step S406 if not. In step S406, the control unit 80 determines whether the temperature gradient value of the temperature detected by the environmental sensor 40 is greater than the second gradient threshold, moves the sequence to step S408 if the temperature gradient value is greater than the second gradient threshold, and moves the sequence to step S407 if not. In step S407, the control unit 80 determines whether a predetermined length of time has passed after the start of driving the fan 70, moves the sequence to step S408 if the predetermined length of time has passed, and returns the sequence to step S405 and repeats the aforementioned determinations if not.

When the sequence moves to step S408 from any of steps S405 to S407, the control unit 80 stops driving the fan 70 and ends the processing of the sequence in FIG. 14. Although the third temperature threshold used in step S405 is set to the same value as that used in step S401, the threshold may be set to a different value. Likewise, although the second gradient threshold used in step S406 is set to the same value as that used in step S403, the threshold may be set to a different value. These thresholds and the resistance threshold $R_{th2}$ are set as appropriate based on the configuration of the image forming apparatus 100 and the like. Additionally, only some (one or two) of the three conditions for stopping the driving of the fan 70, determined in steps S405 to S407, may be used.

<Control of Process Speed>

The image forming apparatus 100 of the present embodiment may perform control to temporarily reduce the process speed when forming images (e.g., change from the normal speed to the low speed) to avoid transfer defects when transferring toner images in high-temperature environments as described above.

Specifically, the control unit 80 changes the process speed when forming images from the normal speed to the low speed when the temperature of the intermediate transfer belt 8 (e.g., an estimated value based on the temperature detected by the environmental sensor 40) is at least a fourth temperature threshold and the input image includes a half-tone region. For example, the fourth temperature threshold is set to 35° C., the normal speed is set to 300 mm/s, and the low speed is set to 100 mm/s. Note that the fourth temperature threshold is set as appropriate based on the configuration of the primary transfer unit, the material of the components thereof, the configuration of the intermediate transfer belt 8, and the like. The normal speed and the low speed are also set as appropriate based on the configuration of the image forming apparatus 100 and the like.

Through this, the target current value of the primary transfer current for obtaining good transferability for toner images can be reduced, and the primary transfer voltage used can be reduced as well. Accordingly, good transferability can be achieved even when a solid image having broad margins, such as that illustrated in FIG. 13A, is formed, while also suppressing image defects that occur in an image formed based on an input image that includes a half-tone region.

Additionally, if the input image does not include a half-tone region, the control unit 80 may form images while keeping the process speed used during image formation at the normal speed (e.g., 300 mm/s). At this time, as in the second embodiment, the control unit 80 may set a value obtained by multiplying the voltage $V_{atvc}$ determined through ATVC by the predetermined coefficient a (a>1) as the primary transfer voltage $V_{t1}$ used when forming images, and then form the image. For example, a is set to 1.1.

In this manner, setting the primary transfer voltage to a voltage higher than the voltage determined by executing ATVC makes it possible to increase the primary transfer current flowing in a solid image having broad margins, such as that illustrated in FIG. 13A. Accordingly, good transferability for toner images can be achieved without reducing the process speed from the normal speed.

Note that the control unit 80 may predict a period during which the temperature of the intermediate transfer belt 8 stays at least the fourth temperature threshold (e.g., ten minutes) based on the temperature detected by the environmental sensor 40. In this case, if the input image includes a half-tone region, the control unit 80 may change the process speed from the normal speed to the low speed during the predicted period.

As described above, according to the image forming apparatus 100 of the present embodiment, when it is assumed that the interior of the image forming apparatus 100 can be cooled by outside air, driving the fan 70 and taking outside air into the apparatus makes it possible to efficiently cool the interior of the apparatus. This causes the temperature of the intermediate transfer belt 8 to drop, and makes it possible to shorten the period in which it is necessary to change the process speed to the speed to a higher speed in order to ensure the transferability of toner images.

OTHER EMBODIMENTS

Although the image forming apparatus 100 employs an intermediate transfer method in the foregoing embodiments, the transfer method is not limited thereto, and the foregoing embodiments can also be applied to a method which transfers a toner image from a photosensitive member to a recording material without traversing an intermediate transfer member (intermediate transfer belt).

Figure 15:
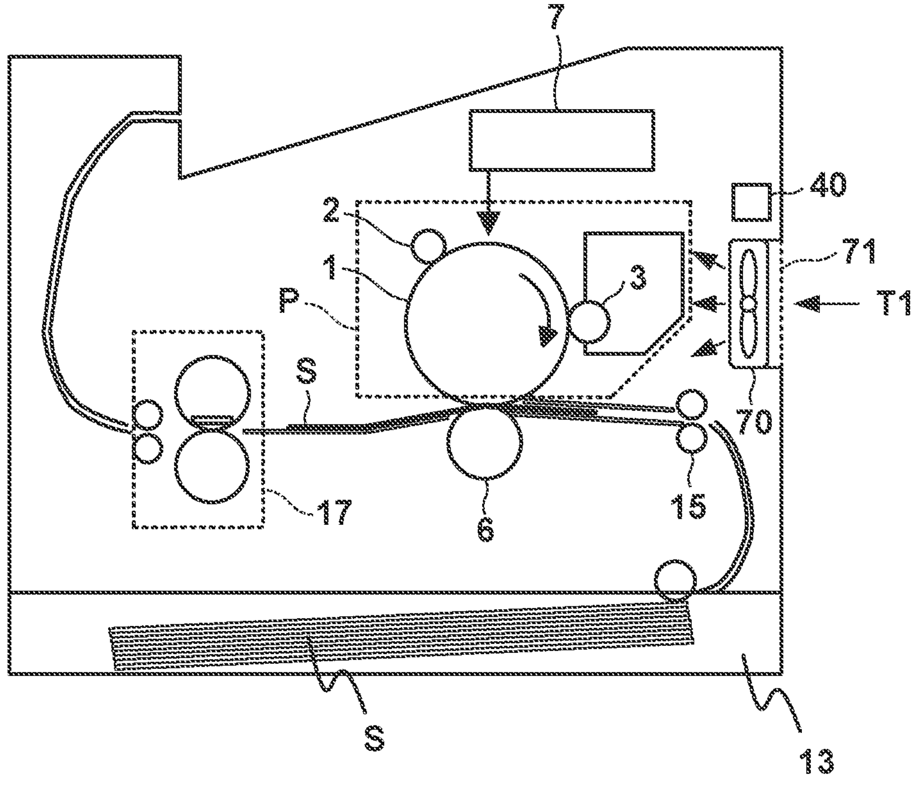
FIG. 15 is a cross-sectional view illustrating an example of the hardware configuration of an image forming apparatus that does not use an intermediate transfer member.

FIG. 15 is a cross-sectional view schematically illustrating an example of the hardware configuration of an image forming apparatus that transfers toner images to recording material without traversing an intermediate transfer member. In FIG. 15, elements that are the same as or correspond to elements in the image forming apparatus 100 of the foregoing embodiments are given the same reference signs. The image forming apparatus includes the process cartridge P that can be attached to and removed from the image forming apparatus. The process cartridge P includes the photosensitive drum 1, the charging roller 2, and the developing roller 3.

The photosensitive drum 1 (photosensitive member) is driven so as to rotate in the direction of the arrow indicated in FIG. 1. The charging roller 2 uniformly charges the surface of the photosensitive drum 1. The laser unit 7 forms an electrostatic latent image on the surface of the photosensitive drum 1 by exposing the photosensitive drum 1 based on an image signal (image data). The developing roller 3 forms the toner image on the photosensitive drum 1 by developing the electrostatic latent image formed on the photosensitive drum 1 using the toner supplied from the toner receptacle 23.

The image forming apparatus includes a transfer roller 6 as a transfer member that transfers the toner image from the photosensitive drum 1 to the recording material S. The toner image formed on the photosensitive drum 1 is transferred to the recording material S transported from the recording material cassette 13 at a transfer position (transfer unit) where the transfer roller 6 and the photosensitive drum 1 make contact. The transfer roller 6 is constituted by a foam-covered elastic roller having an elastic foam layer formed around a shaft made of metal such as SUS. The recording material S onto which the toner image has been transferred at the transfer unit is transported to the fixing device 17. The fixing device 17 performs fixing processing for fixing the transferred toner image onto the recording material S by applying heat and pressure to the recording material S. The recording material S subjected to the fixing processing is discharged onto a discharge tray.

The image forming apparatus illustrated in FIG. 15 includes a fan 70 that takes outside air into the image forming apparatus 100 as a temperature adjustment mechanism for adjusting the temperature within the apparatus. The fan 70 is an intake-type fan that takes outside air into the interior of the image forming apparatus 100 and generates an air flow T1. The fan 70 is disposed in the vicinity of the opening 71 formed in a side surface of the image forming apparatus, as illustrated in FIG. 15. The opening 71 enables the inside and the outside of the image forming apparatus to communicate. The fan 70 is disposed within the image forming apparatus opposite the opening 71. The fan 70 is mainly used for cooling the process cartridge P and the transfer roller 6.

In this image forming apparatus too, the resistance value of the transfer roller 6 increases due to the transfer roller 6 entering a low-temperature state when used first thing in the morning in an office environment in a cold region, for example, in the same manner as in the foregoing embodiments, and transfer defects in the toner images may arise at the transfer unit as a result. Similarly, the resistance value of the transfer roller 6 decreases due to the transfer roller 6 entering a high-temperature state when used first thing in the morning in an office environment in a warm region, and transfer defects in the toner images may arise at the transfer unit as a result.

Accordingly, the drive control of the fan 70 and the control of the process speed according to the foregoing embodiments may be applied in the image forming apparatus having the configuration illustrated in FIG. 15. Through this, the same effects as those of the foregoing embodiments can be achieved.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-075362, filed Apr. 28, 2022, which is hereby incorporated by reference herein in its entirety.

What is claimed is:

1. An image forming apparatus comprising:

a forming unit configured to form a toner image on a photosensitive member;

a transfer unit configured to transfer the toner image formed on the photosensitive member onto a recording material;

a blowing unit configured to take outside air into the image forming apparatus to generate an air flow for adjusting a temperature of the transfer unit;

a temperature detection unit configured to detect an ambient temperature outside the image forming apparatus; and a control unit configured to control driving of the blowing unit based on the ambient temperature detected by the temperature detection unit, wherein the control unit drives the blowing unit in a case where the ambient temperature detected by the temperature detection unit is less than or equal to a first temperature threshold and a gradient value indicating a change in the detected ambient temperature is at least a first gradient threshold.

2. The image forming apparatus according to claim 1, wherein the transfer unit includes an intermediate transfer member onto which the toner image is to be transferred from the photosensitive member, and a transfer member configured to transfer the toner image from the photosensitive member to the intermediate transfer member.

3. The image forming apparatus according to claim 2, wherein, after starting to drive the blowing unit, the control unit stops driving the blowing unit under at least one of the following conditions: the ambient temperature detected by the temperature detection unit exceeds the first temperature threshold, the gradient value is below the first gradient threshold, or a predetermined length of time has passed.

4. The image forming apparatus according to claim 3, wherein, in a case where a current temperature and a temperature from a predetermined time earlier are detected by the temperature detection unit, the control unit obtains, as the gradient value, a difference value between the current temperature and the temperature from the predetermined time earlier.

5. The image forming apparatus according to claim 2, wherein, in a case where the control unit further obtains a temperature of the intermediate transfer member, the control unit sets a process speed used when performing image formation to a first speed in a case where the obtained temperature is not lower than a second temperature threshold, and sets the process speed to a second speed slower than the first speed in a case where the obtained temperature is lower than the second temperature threshold.

6. The image forming apparatus according to claim 5, wherein, in obtaining the temperature, the control unit obtains the temperature of the intermediate transfer member as an estimated value based on the ambient temperature detected by the temperature detection unit.

7. The image forming apparatus according to claim 6, wherein, after setting the process speed to the second speed, the control unit further changes the process speed from the second speed to the first speed when the obtained temperature of the intermediate transfer member reaches the second temperature threshold.

8. The image forming apparatus according to claim 5, wherein the second temperature threshold is determined based on a temperature of the intermediate transfer member at which an abnormal discharge occurs at a transfer position where the toner image is transferred from the photosensitive member, in a case where a transfer voltage, which is applied to the transfer member, is determined though constant current control for controlling the transfer voltage such that a current value of a transfer current flowing in the transfer unit converges on a target current value.

9. The image forming apparatus according to claim 2, wherein the control unit further is configured to:

predict a period during which a temperature of the intermediate transfer member is below a second temperature threshold based on the ambient temperature detected by the temperature detection unit, set a process speed used when performing image formation to a second speed slower than a first speed throughout the period predicted, and change the process speed from the second speed to the first speed after the period ends.

10. The image forming apparatus according to claim 2, wherein the control unit further is configured to:

obtain a temperature of the intermediate transfer member, set a process speed used when performing image formation to a first speed in a case where the obtained temperature is not lower than a second temperature threshold, set the process speed to a second speed slower than the first speed in a case where the obtained temperature is lower than the second temperature threshold and an input image for image formation includes a region having a density level in a specific range corresponding to a half-tone, and set the process speed to the first speed in a case where the obtained temperature is lower than the second temperature threshold and the input image for image formation does not include the region having the density level in the specific range.

11. The image forming apparatus according to claim 10, wherein, in the case where the obtained temperature is lower than the second temperature threshold and the input image for image formation includes the region having the density level in the specific range, the control unit sets a transfer voltage applied to the transfer member to a voltage higher than a voltage which is determined through constant current control for controlling the transfer voltage applied to the transfer member such that a current value of a transfer current flowing in the transfer member converges on a target current value.

12. The image forming apparatus according to claim 2, further comprising a resistance detection unit configured to detect a resistance value of the intermediate transfer member, wherein, even if the ambient temperature detected by the temperature detection unit is less than or equal to the first temperature threshold and the gradient value indicating the change in the detected ambient temperature is at least the first gradient threshold, the control unit does not drive the blowing unit in a case where the resistance value detected by the resistance detection unit is below a resistance value threshold.

13. An image forming apparatus comprising:

a forming unit configured to form a toner image on a photosensitive member;

a transfer unit configured to transfer the toner image formed on the photosensitive member onto a recording material;

a blowing unit configured to take outside air into the image forming apparatus to generate an air flow for adjusting a temperature of the transfer unit;

a temperature detection unit configured to detect an ambient temperature outside the image forming apparatus; and a control unit configured to control driving of the blowing unit based on the ambient temperature detected by the temperature detection unit, wherein the control unit drives the blowing unit in a case where the ambient temperature detected by the temperature detection unit is at least a first temperature threshold and a gradient value indicating a change in the detected ambient temperature is less than or equal to a first gradient threshold.

14. The image forming apparatus according to claim 13, wherein the transfer unit includes an intermediate transfer member onto which the toner image is to be transferred from the photosensitive member, and a transfer member configured to transfer the toner image from the photosensitive member to the intermediate transfer member.

15. The image forming apparatus according to claim 14, wherein, after starting to drive the blowing unit, the control unit stops driving the blowing unit under at least one of the following conditions: the ambient temperature detected by the temperature detection unit is below the first temperature threshold, the gradient value exceeds the first gradient threshold, or a predetermined length of time has passed.

16. The image forming apparatus according to claim 15, wherein, in a case where a current temperature and a temperature from a predetermined time earlier are detected by the temperature detection unit, the control unit obtains, as the gradient value, a difference value between the current temperature and the temperature from the predetermined time earlier.

17. The image forming apparatus according to claim 14, wherein, in a case where the control unit further obtains a temperature of the intermediate transfer member, the control unit sets a process speed used when performing image formation to a first speed in a case where the obtained temperature does not exceed a second temperature threshold, and sets the process speed to a second speed slower than the first speed in a case where the obtained temperature exceeds the second temperature threshold.

18. The image forming apparatus according to claim 17, wherein, in obtaining the temperature, the control unit obtains the temperature of the intermediate transfer member as an estimated value based on the ambient temperature detected by the temperature detection unit.

19. The image forming apparatus according to claim 18, wherein, after setting the process speed to the second speed, the control unit further changes the process speed from the second speed to the first speed when the obtained temperature of the intermediate transfer member reaches the second temperature threshold.

20. The image forming apparatus according to claim 14, wherein the control unit further is configured to:

predict a period during which a temperature of the intermediate transfer member exceeds a second temperature threshold based on the ambient temperature detected by the temperature detection unit, set a process speed used when performing image formation to a second speed slower than a first speed throughout the period predicted, change the process speed from the second speed to the first speed after the period ends.

* * * * *